(12) United States Patent
Tanaka et al.

(10) Patent No.: US 7,576,032 B2
(45) Date of Patent: Aug. 18, 2009

(54) CATALYST COMPOSITION

(75) Inventors: Hirohisa Tanaka, Shiga (JP); Isao Tan, Shiga (JP); Mari Uenishi, Shiga (JP); Masashi Taniguchi, Shiga (JP)

(73) Assignee: Daihatsu Motor Co., Ltd., Osaka (JP)

( * ) Notice: Subject to any disclaimer, the term of this patent is extended or adjusted under 35 U.S.C. 154(b) by 265 days.

(21) Appl. No.: 10/583,153

(22) PCT Filed: Dec. 15, 2004

(86) PCT No.: PCT/JP2004/019138

§ 371 (c)(1),
(2), (4) Date: Jun. 16, 2006

(87) PCT Pub. No.: WO2005/058490

PCT Pub. Date: Jun. 30, 2005

(65) Prior Publication Data

US 2007/0249497 A1    Oct. 25, 2007

(30) Foreign Application Priority Data

Dec. 17, 2003 (JP) .............................. 2003-419611

(51) Int. Cl.
*B01J 23/02* (2006.01)
*B01J 23/06* (2006.01)
*B01J 23/00* (2006.01)
*B01J 23/10* (2006.01)
*B01J 23/42* (2006.01)
*B01J 23/44* (2006.01)

(52) U.S. Cl. ................... 502/340; 502/302; 502/303; 502/304; 502/325; 502/328; 502/339; 502/350

(58) Field of Classification Search .......... 502/300–355
See application file for complete search history.

(56) References Cited

U.S. PATENT DOCUMENTS 4,110,258 A * 8/1978 Lauder ..................... 502/306

(Continued)

FOREIGN PATENT DOCUMENTS

JP        H05-76762        3/1993

(Continued)

OTHER PUBLICATIONS

Y. Nishihata et al., "Self-regeneration of a Pd-perovskite catalyst for automotive emission control", Nature, Jul. 11, 2002, vol. 418(6894), Nature Publishing Group, Japan.

*Primary Examiner*—Steven Bos
*Assistant Examiner*—Anthony J Zimmer
(74) *Attorney, Agent, or Firm*—Jean C. Edwards, Esq.; Akerman Senterfitt

(57) ABSTRACT

A catalyst composition which prevents deterioration due to grain growth of Rh and/or Pt, includes a perovskite-type composite oxide represented by the following general formula (1):

$$A_{1-x}A'_xB_{1-(y+z)}B'_yN_zO_3 \qquad (1)$$

wherein A represents at least one element selected from alkaline earth metals; A' represents at least one element selected from rare earth elements; B represents at least one element selected from Ti, Zr, and Hf; B' represents at least one element selected from transition elements (excluding rare earth elements, Ti, Zr, Hf, Rh, and Pt) and Al; N represents at least one element selected from Rh and Pt; x represents an atomic ratio satisfying the following condition: $0 \leqq x \leqq 0.4$; y represents an atomic ratio satisfying the following condition: $0 \leqq y < 0.5$; z represents an atomic ratio satisfying the following condition: $0 < z \leqq 0.5$; and X represents 0 when N represents Pt alone.

4 Claims, 22 Drawing Sheets

U.S. PATENT DOCUMENTS

| | | | |
|---|---|---|---|
| 5,380,692 A | 1/1995 | Nakatsuji et al. | |
| 6,434,298 B1 * | 8/2002 | Lyons et al. | 385/37 |
| 7,105,147 B2 * | 9/2006 | Kurimura et al. | 423/648.1 |
| 7,166,267 B2 * | 1/2007 | Villa | 423/594.12 |
| 7,338,590 B1 * | 3/2008 | Shelnutt et al. | 205/628 |
| 2004/0101472 A1 * | 5/2004 | Kurimura et al. | 423/650 |
| 2005/0249653 A1 | 11/2005 | Tanaka et al. | |

FOREIGN PATENT DOCUMENTS

| | | |
|---|---|---|
| JP | H05-261289 | 10/1993 |
| JP | H06-100319 | 4/1994 |
| JP | H08-217461 | 8/1996 |
| JP | H08-224446 | 9/1996 |
| JP | H11-151440 | 6/1999 |
| JP | 11342337 A * | 12/1999 |
| JP | 2002-204955 | 7/2002 |
| JP | 2002-301337 | 10/2002 |
| JP | 2004-43217 | 2/2004 |
| WO | WO 03008095 A2 * | 1/2003 |

* cited by examiner

CATALYST COMPOSITION

CROSS REFERENCE TO RELATED APPLICATIONS

The present application is a 35 U.S.C. 371 national stage entry of International Patent Application No. PCT/JP2004/019138, filed Dec. 15, 2004, which claims priority from Japanese Patent Application No. JP 2003-419611, filed Dec. 17, 2003, the contents of which are herein incorporated by reference in their entirety.

TECHNICAL FIELD

The present invention relates to a catalyst composition used as a catalyst for vapor or liquid phase reaction.

BACKGROUND ART

Noble metals such as Pt (platinum) and Rh (rhodium) show high catalytic activities and have been widely used as catalytic components of three-way catalysts that can simultaneously clean up carbon monoxide (CO), hydrocarbons (HC), and nitrogen oxides (NOx) contained in emissions.

Of these noble metals, Rh satisfactorily reduces NOx. Thus, for improving the thermostability, Rh is supported by perovskite-type composite oxides represented by the general formula $ABO_3$ through impregnation, for example.

Pt also exhibits insufficient thermostability, although it satisfactorily oxidizes CO even at low temperatures. Thus, for improving the thermostability, Pt is supported by perovskite-type composite oxide represented by the general formula $ABO_3$ through impregnation, for example.

Additionally, by allowing Rh and/or Pt to coordinate in perovskite-type composite oxides, the thermostability can be more improved and the exhaust gas purifying capability can be more increased than by supporting Rh and/or Pt through impregnation.

For example, $La_{0.8}Ba_{0.2}Ni_{0.48}Co_{0.50}Rh_{0.02}O_3$, $La_{0.2}Ba_{0.7}Y_{0.1}Cu_{0.48}Cr_{0.48}Pt_{0.04}O_3$, $La_{0.9}Ce_{0.1}Co_{0.9}Pt_{0.05}Ru_{0.05}O_3$ (Japanese Unexamined Patent Publication No. 8-217461), $La_{0.4}Sr_{0.6}Co_{0.95}Rh_{0.05}O_3$ and $La_{0.4}Sr_{0.6}Co_{0.95}Pt_{0.05}O_3$ (Japanese Unexamined Patent Publication No. 5-76762) have been proposed as perovskite-type composite oxides to which Rh and/or Pt coordinate.

Further, a perovskite-type composite oxide with a specific composition of $LaFe_{0.57}CO_{0.38}Pd_{0.05}O_3$ suppresses grain growth and maintains high catalytic activity over a long time. This is because of a self-regenerative function of the perovskite-type composite oxide, in which Pd is reversibly introduced or extracted to and from a perovskite-type crystal structure corresponding to oxidation-reduction change of emissions. These findings have been obtained in recent years (Y. Nishihata et al., Nature, Vol. 418, No. 6894, pp. 164-167, 11 Jul. 2002).

However, in the perovskite-type composite oxides described in Japanese Unexamined Patent Publication No. 8-217461 and Japanese Unexamined Patent Publication No. 5-76762, it is difficult to prevent grain growth by reversibly introducing and extracting Rh and/or Pt to and from a perovskite-type crystal structure corresponding to oxidation-reduction change of emissions, as described in Nature, Vol. 418, No. 6894, pp. 164-167.

DISCLOSURE OF THE INVENTION

An object of the present invention is to provide a catalyst composition which effectively utilizes the high catalytic activity of Rh and/or Pt, prevents the activity from deteriorating due to grain growth in a long-term use, and exhibits satisfactory catalytic performance over a long time.

The catalyst composition of the present invention comprises a perovskite-type composite oxide represented by the following general formula (1):

$$A_{1-x}A'_xB_{1-(y+z)}B'_yN_zO_3 \quad (1)$$

wherein A represents at least one element selected from alkaline earth metals; A' represents at least one element selected from rare earth elements; B represents at least one element selected from Ti, Zr, and Hf; B' represents at least one element selected from transition elements (excluding rare earth elements, Ti, Zr, Hf, Rh, and Pt) and Al; N represents at least one element selected from Rh and Pt; x represents an atomic ratio satisfying the following condition: $0 \leq x \leq 0.4$; y represents an atomic ratio satisfying the following condition: $0 \leq y < 0.5$; z represents an atomic ratio satisfying the following condition: $0 < z \leq 0.5$; and X represents 0 when N represents Pt alone.

In the general formula (1), A preferably represents at least one element selected from Ca, Sr, and Ba, and A preferably represents Ca when N represents Pt.

In the general formula (1), x preferably represents 0.

In the general formula (1), B preferably represents at least one element selected from Ti and Zr, and B preferably represents Ti when N represents Rh.

In the general formula (1), y preferably represents 0.

The catalyst composition of the present invention also comprises a perovskite-type composite oxide represented by the following general formula (2):

$$AB_{1-z}N_zO_3 \quad (2)$$

wherein A represents at least one element selected from Ca, Sr and Ba; B represents at least one element selected from Ti and Zr; N represents at least one element selected from Rh and Pt; and z represents an atomic ratio satisfying the following condition: $0 < z \leq 0.5$.

The catalyst composition of the present invention also comprises a perovskite-type composite oxide represented by the following general formula (3):

$$AB_{1-z}Rh_zO_3 \quad (3)$$

wherein A represents at least one element selected from Ca, Sr and Ba; B represents Ti; and z represents an atomic ratio satisfying the following condition: $0 < z \leq 0.5$.

The catalyst composition of the present invention also comprises a perovskite-type composite oxide represented by the following general formula (4):

$$AB_{1-z}Pt_zO_3 \quad (4)$$

wherein A represents at least one element selected from Ca and Ba; B represents at least one element selected from Ti and Zr; and z represents an atomic ratio satisfying the following condition: $0 < z \leq 0.5$.

The catalyst composition of the present invention comprises a perovskite-type composite oxide represented by the following general formula (5):

$$A_wA'_xB_{1-(y+z)}B'_yN_zO_{3+\delta} \quad (5)$$

wherein A represents at least one element selected from alkaline earth metal elements; A' represents at least one element selected from rare earth elements; B represents at least one element selected from Ti, Zr, and Hf; B' represents at least one element selected from transition elements (excluding rare earth elements, Ti, Zr, Hf, Rh, and Pt) and Al; N represents at least one element selected from Rh and Pt; x represents an atomic ratio satisfying the following condition: $0 \leq x \leq 0.4$; w represents an atomic ratio satisfying the following condition: $w > (1-x)$; y represents an atomic ratio satisfying the following condition: $0 \leq y < 0.5$; z represents an atomic ratio satisfying the following condition: $0 < z \leq 0.5$; δ represents an oxygen excess; and x represents 0 when N represents Pt alone.

In the general formula (5), A preferably represents at least one element selected from Ca, Sr, and Ba, and A preferably represents Ca when N represents Pt.

In the general formula (5), x preferably represents 0.

In the general formula (5), B preferably represents at least one element selected from Ti and Zr, and B preferably represents Ti when N represents Rh.

In the general formula (5), y preferably represents 0.

The catalyst composition of the present invention also comprises a perovskite-type composite oxide represented by the following general formula (6):

$$A_v B_{1-z} N_z O_{3+\delta} \quad (6)$$

wherein A represents at least one element selected from Ca, Sr and Ba; B represents at least one element selected from Ti and Zr; N represents at least one element selected from Rh and Pt; v represents an atomic ratio satisfying the following condition: $1 < v$; z represents an atomic ratio satisfying the following condition: $0 < z \leq 0.5$; and δ represents an oxygen excess.

The catalyst composition of the present invention also comprises a perovskite-type composite oxide represented by the following general formula (7):

$$A_v B_{1-z} Rh_z O_{3+\delta} \quad (7)$$

wherein A represents at least one element selected from Ca, Sr and Ba; B represents Ti; v represents an atomic ratio satisfying the following condition: $1 < v$; z represents an atomic ratio satisfying the following condition: $0 < z \leq 0.5$; and δ represents an oxygen excess.

The catalyst composition of the present invention also comprises a perovskite-type composite oxide represented by the following general formula (8):

$$A_v B_{1-z} Pt_z O_{3+\delta} \quad (8)$$

wherein A represents at least one element selected from Ca and Ba; B represents at least one element selected from Ti and Zr; v represents an atomic ratio satisfying the following condition: $1 < v$; z represents an atomic ratio satisfying the following condition: $0 < z \leq 0.5$; and δ represents an oxygen excess.

The production method of the perovskite-type composite oxide of the present invention comprises formulating materials based on each atomic ratio of the perovskite-type composite oxide represented by the general formula (5):

$$A_w A'_x B_{1-(y+z)} B'_y N_z O_{3+\delta} \quad (5)$$

wherein A represents at least one element selected from alkaline earth metal elements; A' represents at least one element selected from rare earth elements; B represents at least one element selected from Ti, Zr, and Hf; B' represents at least one element selected from transition elements (excluding rare earth elements, Ti, Zr, Hf, Rh, and Pt) and Al; N represents at least one element selected from Rh and Pt; x represents an atomic ratio satisfying the following condition: $0 \leq x \leq 0.4$; w represents an atomic ratio satisfying the following condition: $w > (1-x)$; y represents an atomic ratio satisfying the following condition: $0 \leq y < 0.5$; z represents an atomic ratio satisfying the following condition: $0 < z \leq 0.5$; δ represents an oxygen excess; and x represents 0 when N represents Pt alone.

According to the catalyst composition of the present invention, since Rh and/or Pt efficiently repetitively forms solid-solution under an oxidative atmosphere and deposits under a reducing atmosphere (self-regeneration) with respect to a perovskite-type composite oxide, these noble metals can be maintained in a dispersed state. Therefore, the catalyst composition prevents the activity from deteriorating due to grain growth, and exhibits satisfactory catalytic performance over a long time. Consequently, the catalyst composition can be widely used as a catalyst for vapor or liquid phase reaction. Particularly, it can exhibit a satisfactory exhaust gas purifying performance over a long time and is therefore advantageously usable as an exhaust gas purifying catalyst for purifying emissions discharged from internal combustion engines such as gasoline and diesel engines, and boilers.

Furthermore, according to the production method of the perovskite-type composite oxide of the present invention, since materials are prepared so that an atomic ratio of the elements to be coordinated on the A site exceeds 1, it is possible to dissolve Rh and/or Pt to stably form a solid solution at a high rate. Therefore, it is possible to stably produce a perovskite-type composite oxide in which Rh and/or Pt highly dissolves to form a solid solution. Further, according to the production method of the perovskite-type composite oxide of the present invention, even when materials containing a constituent element on the site A are lost during the production, the materials are prepared so that the atomic ratio of the elements to be coordinated on the A site exceeds 1, it is possible to suppress that the atomic ratio on the A sire is smaller than that on the B site. Therefore, it is possible to stably produce a perovskite-type composite oxide in which Rh and/or Pt dissolves to form a solid solution at a high rate.

In the perovskite-type composite oxide of the present invention, when the atomic ratio of the elements to be coordinated on the A site exceeds 1, it is possible to provide a perovskite-type composite oxide which has stable quality in which Rh and/or Pt dissolves to form a solid solution at a high rate.

BEST MODE FOR CARRYING OUT THE INVENTION

Figure 1:
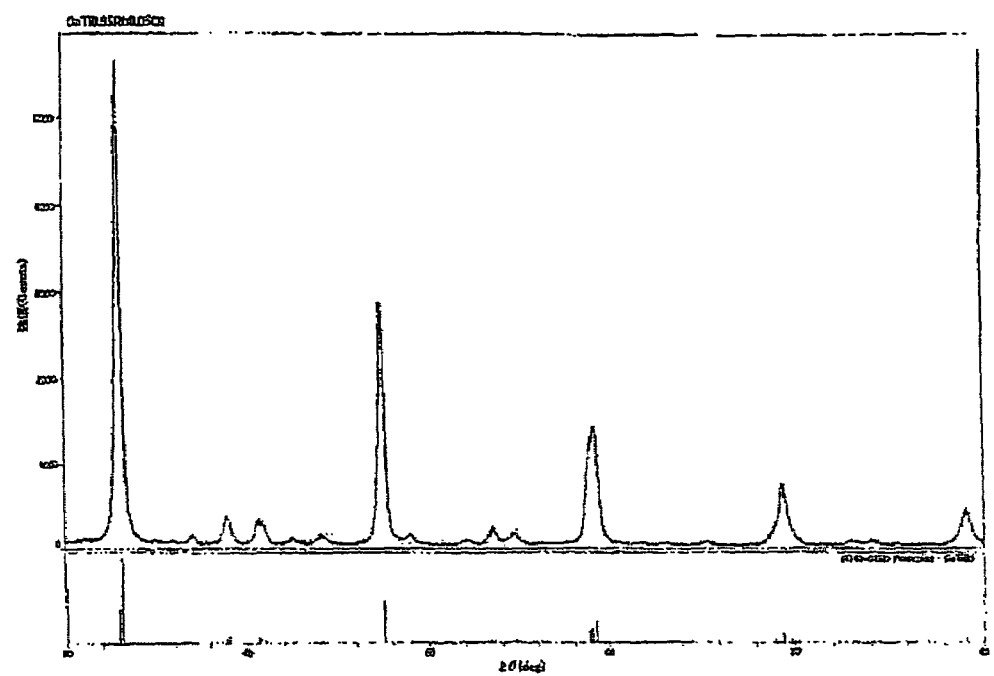
FIG. 1 is a graph showing X-ray diffraction data of a powder of Example 1.

A catalyst composition of the present invention contains a perovskite-type composite oxide represented by the following general formula (1):

$$A_{1-x}A'_xB_{1-(y+z)}B'_yN_zO_3 \quad (1)$$

wherein A represents at least one element selected from alkaline earth metals; A' represents at least one element selected from rare earth elements; B represents at least one element selected from Ti, Zr, and Hf; B' represents at least one element selected from transition elements (excluding rare earth elements, Ti, Zr, Hf, Rh, and Pt) and Al; N represents at least one element selected from Rh and Pt; x represents an atomic ratio satisfying the following condition: $0 \leq x \leq 0.4$; y represents an atomic ratio satisfying the following condition: $0 \leq y < 0.5$; z represents an atomic ratio satisfying the following condition: $0 < z \leq 0.5$; and X represents 0 when N represents Pt alone.

Also the catalyst composition of the present invention contains a perovskite-type composite oxide represented by the following general formula (5):

$$A_wA'_xB_{1-(y+z)}B'_yN_zO_{3+\delta} \quad (5)$$

wherein A represents at least one element selected from alkaline earth metal elements; A' represents at least one element selected from rare earth elements; B represents at least one element selected from Ti, Zr, and Hf; B' represents at least one element selected from transition elements (excluding rare earth elements, Ti, Zr, Hf, Rh, and Pt) and Al; N represents at least one element selected from Rh and Pt; x represents an atomic ratio satisfying the following condition: $0 \leq x \leq 0.4$; w represents an atomic ratio satisfying the following condition: $w > (1-x)$; y represents an atomic ratio satisfying the following condition: $0 \leq y < 0.5$; z represents an atomic ratio satisfying the following condition: $0 < z \leq 0.5$; $\delta$ represents an oxygen excess; and x represents 0 when N represents Pt alone.

The perovskite-type composite oxides represented by the general formulas (1) and (5) are composite oxides having a perovskite-type crystal structure represented by the general formula $ABO_3$. That is, in the perovskite-type composite oxides, the alkaline earth metal represented by A is essentially coordinated and the rare earth element represented by A' is optionally coordinated on the A site. However, on the B site, when Pt is coordinated alone as a noble metal represented by N, the rare earth element represented by A' is not coordinated and the alkaline earth metal represented by A is coordinated alone.

On the B site, at least one element represented by N and selected from Rh and Pt is essentially coordinated; at least one element represented by B and selected from Ti, Zr and Hf is essentially coordinated; and transition elements represented by B' (excluding rare earth elements, Ti, Zr, Hf, Rh, and Pt) and/or Al are optionally coordinated.

Examples of the alkaline earth metal represented by A in the general formulas (1) and (5) are Be (beryllium), Mg (magnesium), Ca (calcium), Sr (strontium), Ba (barium), and Ra (radium), of which Ca, Sr, and Ba are preferred. Each of these can be used alone or in combination.

When Pt, as a noble metal represented by N, is coordinated on the B site in the general formulas (1) and (5), the alkaline earth metal represented by A is preferably Ca.

Examples of the rare earth element represented by A' in the general formulas (1) and (5) are rare earth elements which are always trivalent, such as Sc (scandium), Y (yttrium), La (lanthanum), Nd (neodymium), Pm (promethium), Gd (gadolinium), Dy (dysprosium), Ho (holmium), Er (erbium), and Lu (lutetium); rare earth elements which can be trivalent and tetravalent, such as Ce (cerium), Pr (praseodymium), and Tb (terbium); and rare earth elements which can be divalent and trivalent, such as Sm (samarium), Eu (europium), Tm (thulium), and Yb (ytterbium), of which earth elements always being trivalent are preferred, and La, Nd, and Y are more preferred. Each of these can be used alone or in combination.

On the A site in the general formulas (1) and (5), x represents the atomic ratio satisfying the following condition: $0 \leq x \leq 0.4$; and x preferably satisfies the following condition: $0 \leq x \leq 0.05$. Specifically, the rare earth element represented by A' is not contained or contained at an atomic ratio of 0.4 or less, and preferably 0.05 or less. Therefore, on the A site, the alkaline earth metal represented by A is contained at an atomic ratio of 0.6 or more, and preferably 0.95 or more.

On the A site in the general formulas (1) and (5), the atomic ratio x more preferably represents 0. Specifically, the A site preferably does not comprise the rare earth element represented by A' but comprises the alkaline earth metal represented by A alone.

On the A site of the general formula (5), w represents atomic ratios satisfying the following conditions: $w > 1-x$, namely, $(w+x) > 1$. The total atomic ratio $(w+x)$ of elements to be coordinated on the A site exceeds 1.00. When the total atomic ratio $(w+x)$ exceeds 1.00, Rh and/or Pt can be dissolved to form more stably a solid solution at a higher rate. The aromatic ratios $(w+x)$ preferably satisfy the following conditions: $1.00 < (w+x) \leq 1.50$, and more preferably $1.00 < (w+x) \leq 1.30$. If the total atomic ratio $(w+x)$ exceeds 1.5, by-products other than the perovskite-type composite oxides may be formed.

When, as a noble metal represented by N, Pt alone is coordinated on the B site in the general formulas (1) and (5) (specifically, except that Rh alone is coordinated or Rh and Pt are coordinated as a noble metal represented by N on the B site), the rare earth element represented by A' is not coordinated and the alkaline earth metal represented by A is coordinated alone.

The element represented by B in the general formulas (1) and (5) is at least one selected from Ti (titanium), Zr (zirconium), and Hf (hafnium), of which Ti and Zr are preferred. Each of Ti, Zr, and Hf can be used alone or in combination.

When, as a noble metal represented by N, Rh is coordinated on the B site in the general formulas (1) and (5), the element represented by B is preferably Ti.

The transition elements represented by B' in the general formulas (1) and (5) are transition elements excluding rare earth elements, Ti, Zr, Hf, Rh, and Pt. Specific examples thereof are, in the Periodic Table of Elements (IUPAC, 1990), elements having atomic numbers of 23 (V) through 30 (Zn), atomic numbers of 41 (Nb) through 48 (Cd), and atomic number of 73 (Ta) through 80 (Hg) (excluding Rh and Pt).

More specific examples of the transition elements represented by B' are Cr (chromium), Mn (manganese), Fe (iron), Co (cobalt), Ni (nickel), and Cu (copper). Each of these transition elements can be used alone or in combination.

Therefore, the transition elements and Al represented by B' are preferably Cr, Mn, Fe, Co, Ni, Cu, and/or Al.

On the B site in the general formulas (1) and (5), y represents an atomic ratio satisfying the following condition: $0 \leq y < 0.5$; and preferably satisfying the following condition: $0 \leq y < 0.3$. That is, on the B site, the transition element and/or Al represented by B' is not contained or is contained at an atomic ratio of less than 0.5, and preferably at an atomic ratio of less than 0.3.

Further, on the B site, z represents the atomic ratio satisfying the following condition: $0 < z \leq 0.5$. That is, Rh and/or Pt are contained on the B site at an atomic ratio of 0.5 or less.

At least one element selected from any of Ti, Zr, and Hf is contained on the B site at a total atomic ratio $(1-(y+z))$. That is, these elements are contained on the B site at an atomic ratio $(1-(y+z))$ as the residue of the total atomic ratio $(y+z)$ of the above-mentioned transition element and/or Al represented by B' and Rh and/or Pt.

The atomic ratio y on the B site in the general formulas (1) and (5) is more preferably 0. That is, the B site preferably does not comprise the transition elements and/or Al represented by B' but only comprises at least one element selected from any of Ti, Zr and Hf represented by B and Rh and/or Pt.

When the A site comprises divalent alkali earth metals and the B site comprises at least one element selected from the tetravalent elements of as Ti, Zr, and Hf, and Rh and/or Pt, it is possible to dissolve the noble metals of Rh and/or Pt to form a solid solution more stably by a combination of divalent alkali earth metals and at least one element selected from the tetravalent elements of Ti, Zr, and Hf.

In the general formula (5), δ represents an oxygen excess. More specifically, it represents the excessive atomic ratio of oxygen atom caused by allowing the constitutional elements of the A site to be excessive to the stoichiometric ratio of a perovskite-type composite oxide of A:B:O=1:1:3.

Consequently, the perovskite-type composite oxide represented by the general formula (1) is preferably a perovskite-type composite oxide represented by the following general formula (2):

$$AB_{1-z}N_zO_3 \quad (2)$$

wherein A represents at least one element selected from Ca, Sr and Ba; B represents at least one element selected from Ti and Zr; N represents at least one element selected from Rh and Pt; and z represents an atomic ratio satisfying the following condition: $0 < z \leq 0.5$.

When, as a noble metal represented by N, Rh is coordinated alone, a perovskite-type composite oxide represented by the following general formula (3) is preferred:

$$AB_{1-z}Rh_zO_3 \quad (3)$$

wherein A represents at least one element selected from Ca, Sr and Ba; B represents Ti; and z represents an atomic ratio satisfying the following condition: $0 < z \leq 0.5$.

When, as a noble metal represented by N, Pt is coordinated alone, a perovskite-type composite oxide represented by the following general formula (4) is preferred:

$$AB_{1-z}Pt_zO_3 \quad (4)$$

wherein A represents at least one element selected from Ca and Ba; B represents at least one element selected from Ti and Zr; and z represents an atomic ratio satisfying the following condition: $0 < z \leq 0.5$.

As the perovskite-type composite oxide represented by the general formula (5), a perovskite-type composite oxide represented by the following general formula (6) is preferred:

$$A_vB_{1-z}N_zO_{3+\delta} \quad (6)$$

wherein A represents at least one element selected from Ca, Sr and Ba; B represents at least one element selected from Ti and Zr; N represents at least one element selected from Rh and Pt; v represents an atomic ratio satisfying the following condition: $1 < v$; z represents an atomic ratio satisfying the following condition: $0 < z \leq 0.5$; and δ represents an oxygen excess.

When, as a noble metal represented by N, Rh is coordinated alone, a perovskite-type composite oxide represented by the following general formula (7) is preferred:

$$A_vB_{1-z}Rh_zO_{3+\delta} \quad (7)$$

wherein A represents at least one element selected from Ca, Sr and Ba; B represents Ti; v represents an atomic ratio satisfying the following condition: $1 < v$; z represents an atomic ratio satisfying the following condition: $0 < z \leq 0.5$; and δ represents an oxygen excess.

When, as a noble metal represented by N, Pt is coordinated alone, a perovskite-type composite oxide represented by the following general formula (8) is preferred:

$$A_vB_{1-z}Pt_zO_{3+\delta} \quad (8)$$

wherein A represents at least one element selected from Ca and Ba; B represents at least one element selected from Ti and Zr; v represents an atomic ratio satisfying the following condition: $1 < v$; z represents an atomic ratio satisfying the following condition: $0 < z \leq 0.5$; and δ represents an oxygen excess.

In the formulas (6), (7) and (8), v preferably satisfies the following condition: $1.00 \leq v < 1.50$, and more preferably $1.00 < v \leq 1.30$.

The above-mentioned perovskite-type composite oxide can be prepared by any suitable process for preparing composite oxides, such as a coprecipitation process, a citrate complex process, or an alkoxide process, without being limited to any particular process.

In the coprecipitation process, the perovskite-type composite oxide can be prepared, for example, in the following manner. Initially, an aqueous mixed salt solution containing salts of the respective elements is prepared so as to establish the above-mentioned stoichiometric ratio of the respective elements. The aqueous mixed salt solution is coprecipitated by adding a neutralizing agent thereto, and the resulting coprecipitate is dried and then subjected to a heat treatment.

Examples of the salts of the respective elements are inorganic salts such as sulfates, nitrates, chlorides, and phosphates; and organic acid salts such as acetates and oxalates. Further, the aqueous mixed salt solution can be prepared, for example, by adding the salts of the elements to water so as to establish the stoichiometric ratio and mixing them with stirring.

Then, the aqueous mixed salt solution is coprecipitated by adding a neutralizing agent thereto. Examples of the neutralizing agent are ammonia and organic bases including amines such as triethylamine and pyridine; and inorganic bases such as sodium hydroxide, potassium hydroxide, potassium carbonate, and ammonium carbonate. The neutralizing agent is added to the mixed salt solution so that the resulting solution has a pH of about 6 to about 10.

A perovskite-type composite oxide can be prepared by optionally washing, drying typically through vacuum drying or air drying, and heat-treating at about 500° C. to 1200° C., preferably at about 600° C. to 1000° C., the obtained coprecipitate.

In the citrate complex process, a perovskite-type composite oxide is prepared, for example, in the following manner. Initially, an aqueous citrate-mixed salt solution containing citric acid and salts of the respective elements is prepared so as to establish slightly excess stoichiometric ratio of the respective elements. The aqueous citrate-mixed salt solution is evaporated to dryness to form citrate complexes of the respective elements. The citrate complexes are provisionally baked and subjected to a heat treatment.

The salts of the respective elements can be the same salts as listed above. The aqueous citrate-mixed salt solution can be prepared by preparing an aqueous mixed salt solution in the abobe-mentioned manner and adding an aqueous solution of citric acid to the aqueous mixed salt solution.

The aqueous citrate-mixed salt solution is then evaporated to dryness to form citrate complexes of the respective elements. The evaporation to dryness is carried out at a temperature at which the formed citrate complexes are not decomposed, for example, at room temperature to about 150° C. thereby to remove fluids. Consequently, the above-mentioned citrate complexes of the respective elements can be formed.

The citrate complexes thus formed are provisionally baked and subjected to a heat treatment. Provisionally baking may be carried out by heating at 250° C. to 350° C. in vacuum or in an inert atmosphere. Then, the citrate complexes are subjected to a heat treatment at about 500° C. to 1200° C., and preferably about 600° C. to 1000° C., to prepare a perovskite-type composite oxide.

In the alkoxide process, the perovskite-type composite oxide can be prepared, for example, in the following manner. A mixed alkoxide solution containing alkoxides of the respective elements excluding Rh, Pt and other noble metals (Ru (ruthenium), Pd (palladium), Ag (silver), Os (osmium), and Ir (iridium)) is prepared so as to establish the stoichiometric ratio of the respective elements. The mixed alkoxide solution is precipitated on hydrolysis by adding a solution containing salts of Rh, Pt or other noble metals, and the precipitate is dried and heat-treated.

Examples of the alkoxides of the respective elements are alcholates each comprising the elements and an alkoxy such as methoxy, ethoxy, propoxy, isopropoxy or butoxy; and alkoxyalcholates of the respective elements represented by the following general formula (9):

wherein E represents the respective element; $R^1$ represents a hydrogen atom or an alkyl group having 1 to 4 carbon atoms; $R^2$ represents an alkyl group having 1 to 4 carbon atoms; i represents an integer of 1 to 3; and j represents an integer of 2 to 4.

More specific examples of the alkoxyalcholates are methoxyethylate, methoxypropylate, methoxybutylate, ethoxyethylate, ethoxypropylate, propoxyethylate, and butoxyethylate.

The mixed alkoxide solution can be prepared, for example, by adding alkoxides of the respective elements to an organic solvent so as to establish the above-mentioned stoichiometric ratio and mixing them with stirring. The organic solvent is not specifically limited, as long as it can dissolve the alkoxides of the respective elements. Examples of such organic solvents are aromatic hydrocarbons, aliphatic hydrocarbons, alcohols, ketones, and esters, of which aromatic hydrocarbons such as benzene, toluene, and xylenes are preferred.

The mixed alkoxide solution is precipitated on hydrolysis. The organic solvent is distilled off from the mixed alkoxide solution to prepare an aqueous slurry solution and an aqueous solution containing salts of Rh, Pt or other noble metals in a predetermined stoichiometric ratio is added to the aqueous slurry solution.

Examples of the aqueous solution containing salts of Rh, Pt or other noble metals are nitrate aqueous solutions, chloride aqueous solutions, aqueous hexaammine chloride solutions, aqueous dinitrodiammine nitrate solutions, aqueous hexachloro acid hydrate solutions, and aqueous potassium cyanide salt solutions.

The resulting aqueous solution is dried after distilling off water by vacuum drying or forced-air drying whereby to obtain a precursor, which is subjected to a heat treatment (baking) by heating at about 500° C. to 1200° C., and preferably about 600° C. to 1000° C., to obtain a perovskite-type composite oxide.

Alternatively, the perovskite-type composite oxide may be prepared in the alkoxide process, for example, in the following manner. The mixed alkoxide solution is mixed with a solution containing salts of Rh, Pt or other noble metals to obtain a homogeneous mixed solution. The resulting solution is precipitated on hydrolysis to obtain a precipitate. The precipitate is dried and subjected to a heat treatment thereby to obtain the perovskite-type composite oxide.

Examples of the organometallic salts of Rh, Pt or other noble metals are carboxylic acid salts of the noble metals formed of such as acetates and propionates; metal chelate complexes of the noble metals, formed typically from β-diketone compounds or β-ketoester compounds represented by the following general formula (10) and/or β-dicarboxylic acid ester compounds represented by the following general formula (11):

wherein $R^3$ represents an alkyl group having 1 to 6 carbon atoms, a fluoroalkyl group or an aryl group having 1 to 6 carbon atoms; $R^4$ represents an alkyl group having 1 to 6 carbon atoms, a fluoroalkyl group or an aryl group having 1 to 6 carbon atoms, or an alkyloxy group having 1 to 4 carbon atoms; and $R^5$ represents a hydrogen atom or an alkyl group having 1 to 4 carbon atoms,

wherein $R^6$ represents an alkyl group having 1 to 6 carbon atoms; and $R^7$ represents a hydrogen atom or an alkyl group having 1 to 4 carbon atoms.

In the general formulas (10) and (11), the alkyl groups having 1 to 6 carbon atoms as $R^3$, $R^4$ and $R^6$ include, for example, methyl, ethyl, propyl, isopropyl, n-butyl, s-butyl, t-butyl, t-amyl, and t-hexyl. The alkyl groups having 1 to 4 carbon atoms as $R^5$ and $R^7$ include, for example, methyl, ethyl, propyl, isopropyl, n-butyl, s-butyl, and t-butyl. The fluoroalkyl groups having 1 to 6 carbon atoms as $R^3$ and $R^4$ include, for example, trifluoromethyl. The aryl groups as $R^3$ and $R^4$ include, for example, phenyl. The alkyloxy group having 1 to 4 carbon atoms as $R^4$ includes, for example, methoxy, ethoxy, propoxy, isopropoxy, n-butoxy, s-butoxy, and t-butoxy.

More specific examples of the β-diketone compounds are 2,4-pentanedione, 2,4-hexanedione, 2,2-dimethyl-3,5-hexanedione, 1-phenyl-1,3-butanedione, 1-trifluoromethyl-1,3-butanedione, hexafluoroacetylacetone, 1,3-diphenyl-1,3-propanedione, and dipivaloylmethane.

More specific examples of the β-ketoester compounds are methyl acetoacetate, ethyl acetoacetate, and t-butyl acetoacetate.

Specific examples of the β-dicarboxylic acid ester compounds are dimethyl malonate and diethyl malonate.

The solution containing the organometallic salts of Rh, Pt or other noble metals can be prepared, for example, by adding organometallic salts such as Rh, Pt and/or other noble metals to an organic solvent so as to establish the stoichiometric ratio and mixing them with stirring. The organic solvent can be the same organic solvents as listed above.

The resulting solution containing the organometallic salts of Rh, Pt and/or other noble metals is mixed with the above-mentioned mixed alkoxide solution to prepare a homogeneous mixed solution, which is precipitated by adding water. The resulting precipitate is dried by vacuum drying or forced-air drying, and heat-treated at about 400° C. to 1000° C., preferably at about 500° C. to 850° C., to obtain a perovskite-type composite oxide.

Alternatively, the perovskite-type composite oxide of the present invention can be prepared in the following manner. Initially, a perovskite-type composite oxide is prepared from elements such as Rh, Pt and other noble metals by the above-mentioned coprecipitation process, citrate complex process, or alkoxide process so as to establish the stoichiometric ratio. Then, Rh, Pt and other noble metals are dissolved in the resulting perovskite-type composite oxide to form a solid solution in the above-mentioned the stoichiometric ratio.

The method for dissolving Rh, Pt and other noble metals in the perovskite-type composite oxide to form a solid solution is not specifically limited and a known method can be used. For example, a solution containing salts of Rh, Pt and/or other noble metals is prepared and a perovskite-type composite oxide is impregnated with the resulting salt-containing solution, and baked.

Solutions containing the above-listed salts can be used as the salt-containing solution. Practical examples thereof are nitrate aqueous solutions, dinitrodiammine nitrate solutions, and chloride aqueous solutions.

More specific examples are rhodium salt solutions such as aqueous rhodium nitrate solution and rhodium chloride solution; and aqueous platinum salt solutions such as dinitrodiammine platinum nitrate solution, chloroplatinic acid solution, and ammineplatinum(IV) solution. After being impregnated with the noble metals, the perovskite-type composite oxide is dried, for example, at 50° C. to 200° C. for 1 to 48 hours and then baked at 350° C. to 1000° C. for 1 to 12 hours.

In the catalyst composition of the present invention, the thus obtained perovskite-type composite oxide is further supported by the noble metal. Catalytic activity can be further improved by supporting the noble metal.

Examples of the noble metal include Ru, Pd, Ag, Os, and Ir, in addition to Rh and Pt, of which Rh, Pd, and Pt are preferred. Each of these noble metals can be used alone or in combination.

The method of supporting the noble metal on the perovskite-type composite oxide is not specifically limited and a known method can be used. For example, a solution containing salts of noble metals is prepared, and the obtained perovskite-type composite oxide is impregnated with the noble metal salt solution and baked. An amount of the noble metals supported on the perovskite-type composite oxide is 20 parts by weight or less, and preferably from 0.2 to 10 parts by weight, based on 100 parts by weight of the perovskite-type composite oxide.

The noble metal salt solution can be a solution of the above-mentioned salts or can practically be nitrate aqueous solutions, dinitrodiammine nitrate solutions, or chloride aqueous solutions. More specific examples are rhodium salt solutions such as rhodium nitrate solution and rhodium chloride solution; palladium salt solutions such as palladium nitrate solution and palladium chloride solution; platinum salt solutions such as dinitrodiammine platinum nitrate solution, chloroplatinic acid solution, and ammineplatinum(IV) solution.

The perovskite-type composite oxide is impregnated with the noble metal salt solution, then dried at 50° C. to 200° C. for 1 to 48 hours and further baked at 500° C. to 1200° C. for 1 to 12 hours.

The perovskite-type composite oxide thus obtained can be used directly as a catalyst composition, but is usually prepared as a catalyst composition by a known method of supporting on a catalyst carrier, for example.

The catalyst carrier includes, but is not specifically limited to, known catalyst carriers such as honeycomb monolithic carriers comprising cordierite.

To support the obtained perovskite-type composite oxide on the catalyst carrier, water is added to obtain a slurry, which is then coated onto the catalyst carrier, dried and further heat-treated at about 300° C. to 800° C., preferably about 300° C. to 600° C.

In the thus obtained catalyst composition of the present invention, Rh and/or Pt are coordinated in a crystal structure of the perovskite-type composite oxide, and the coordinated Rh and/or Pt are deposited from the crystal structure under a reducing atmosphere and constitute a solid solution in the crystal structure under an oxidative atmosphere.

Consequently, in the catalyst composition of the present invention, grain growth of Rh and/or Pt is effectively suppressed over a long period of service and these noble metals can be maintained in a dispersed state because of a self-regenerative function, in which the noble metals repetitively form solid solution under an oxidative atmosphere and deposit under a reducing atmosphere. As a result, high catalytic activity can be maintained over a long time even when the amounts of Rh and/or Pt are drastically decreased.

Therefore, according to the production method of the perovskite-type composite oxide of the present invention, it is possible to stably produce a perovskite-type composite oxide in which Rh and/or Pt highly dissolves to stably form a solid solution.

Further, even when a material containing a constituent element on the site A is lost during the production, the material is prepared so that the atomic ratio of the elements to be coordinated on the A site exceeds 1, therefore, it is possible to suppress that the atomic ratio on the A sire is smaller than that on the B site. Accordingly, it is possible to stably produce a perovskite-type composite oxide in which Rh and/or Pt highly dissolves to form a solid solution.

When the atomic ratio of the elements to be coordinated on the A site exceeds 1, it is possible to produce a perovskite-type composite oxide with a stable quality in which Rh and/or Pt highly dissolves to form a solid solution.

Therefore, the catalyst composition of the present invention can be widely used as a catalyst for vapor or liquid phase reaction. Particularly, it can exhibit a satisfactory exhaust gas purifying performance over a long time and is therefore advantageously usable as an exhaust gas purifying catalyst for purifying emissions discharged from internal combustion engines such as gasoline and diesel engines, and boilers.

EXAMPLES

The present invention will be illustrated in further detail by way of the following Examples and Comparative Examples, which by no means limit the scope of the present invention.

Example 1

Production of $CaTi_{0.95}Rh_{0.05}O_3$

| Calcium isopropoxide | 15.8 g (0.100 mol) |
|---|---|
| Titanium isopropoxide | 27.0 g (0.095 mol) |

A mixed alkoxide solution was prepared by charging the above components in a 500 mL round-bottomed flask, adding 200 mL of toluene and dissolving them with stirring. The mixed alkoxide solution was hydrolyzed by adding dropwise 200 mL of deionized water to obtain a white viscous precipitate. The toluene was distilled off from the mixed alkoxide solution to obtain an aqueous slurry, and the aqueous slurry was mixed with 10.29 g (Rh content: 5.00% by weight, 0.005 mol) of an aqueous rhodium nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 950° C. in the air for 2 hours to obtain 13.5 g of a brown powder of an Rh-containing perovskite-type composite oxide having the composition of $CaTi_{0.95}Rh_{0.5}O_3$ (Rh content: 3.71% by weight).

The X-ray diffraction analysis of the powder revealed that it was identified as a single crystal phase comprising an Rh-containing perovskite-type composite oxide having the composition of $CaTi_{0.95}Rh_{0.05}O_3$. Data of the X-ray diffraction are shown in FIG. 1.

Example 2

Production of $CaTi_{0.98}Rh_{0.02}O_3$

| Calcium isopropoxide | 15.8 g (0.100 mol) |
|---|---|
| Titanium isopropoxide | 27.9 g (0.098 mol) |

After the above components were charged in a 500 mL round-bottomed flask and treated by the same procedure of Example 1, the obtained aqueous slurry was mixed with 4.12 g (Rh content: 5.00% by weight, 0.002 mol) of an aqueous rhodium nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 800° C. in the air for 1 hour to obtain 13.2 g of a brown powder of an Rh-containing perovskite-type composite oxide having the composition of $CaTi_{0.98}Rh_{0.02}O_3$ (Rh content: 1.50% by weight).

The X-ray diffraction analysis of the powder revealed that it was identified as a single crystal phase comprising an Rh-containing perovskite-type composite oxide having the composition of $CaTi_{0.98}Rh_{0.02}O_3$.

Example 3

Production of $CaTi_{0.98}Pt_{0.02}O_3$

| Calcium isopropoxide | 15.8 g (0.100 mol) |
|---|---|
| Titanium isopropoxide | 27.9 g (0.098 mol) |

After the above components were charged in a 0.500 mL round-bottomed flask and treated by the same procedure of Example 1, the obtained aqueous slurry was mixed with 8.48 g (Pt content: 4.60% by weight, 0.002 mol) of an aqueous dinitrodiammine platinum nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 700° C. in the air for 1 hour to obtain 13.6 g of a brown powder of a Pt-containing perovskite-type composite oxide having the composition of $CaTi_{0.98}Rh_{0.02}O_3$ (Pt content: 2.81% by weight).

Figure 2:
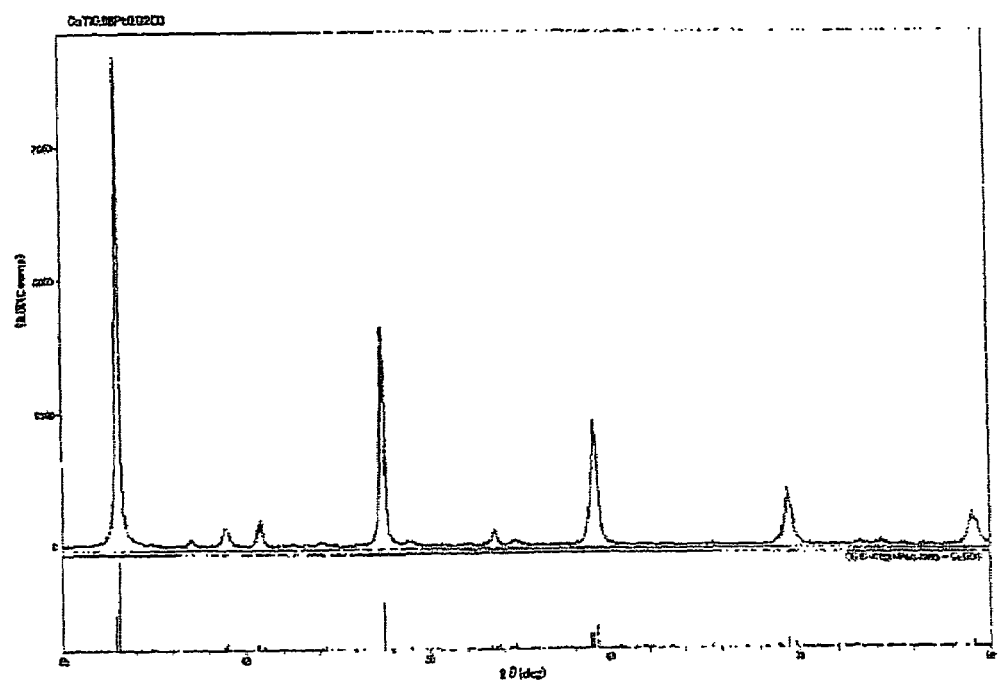
FIG. 2 is a graph showing X-ray diffraction data of a powder of Example 3.
Figure 3:
FIG. 3 is an image processed by TEM micrograph of the powder of Example 1 (after oxidation treatment).
Figure 4:
FIG. 4 is an image processed by TEM micrograph of the powder of Example 1 (after reduction treatment).
Figure 5:
FIG. 5 is an image processed by TEM micrograph of the powder of Example 1 (after reoxidation treatment).
Figure 6:
FIG. 6 is an image processed by TEM micrograph of the powder of Example 3 (after oxidation treatment).
Figure 7:
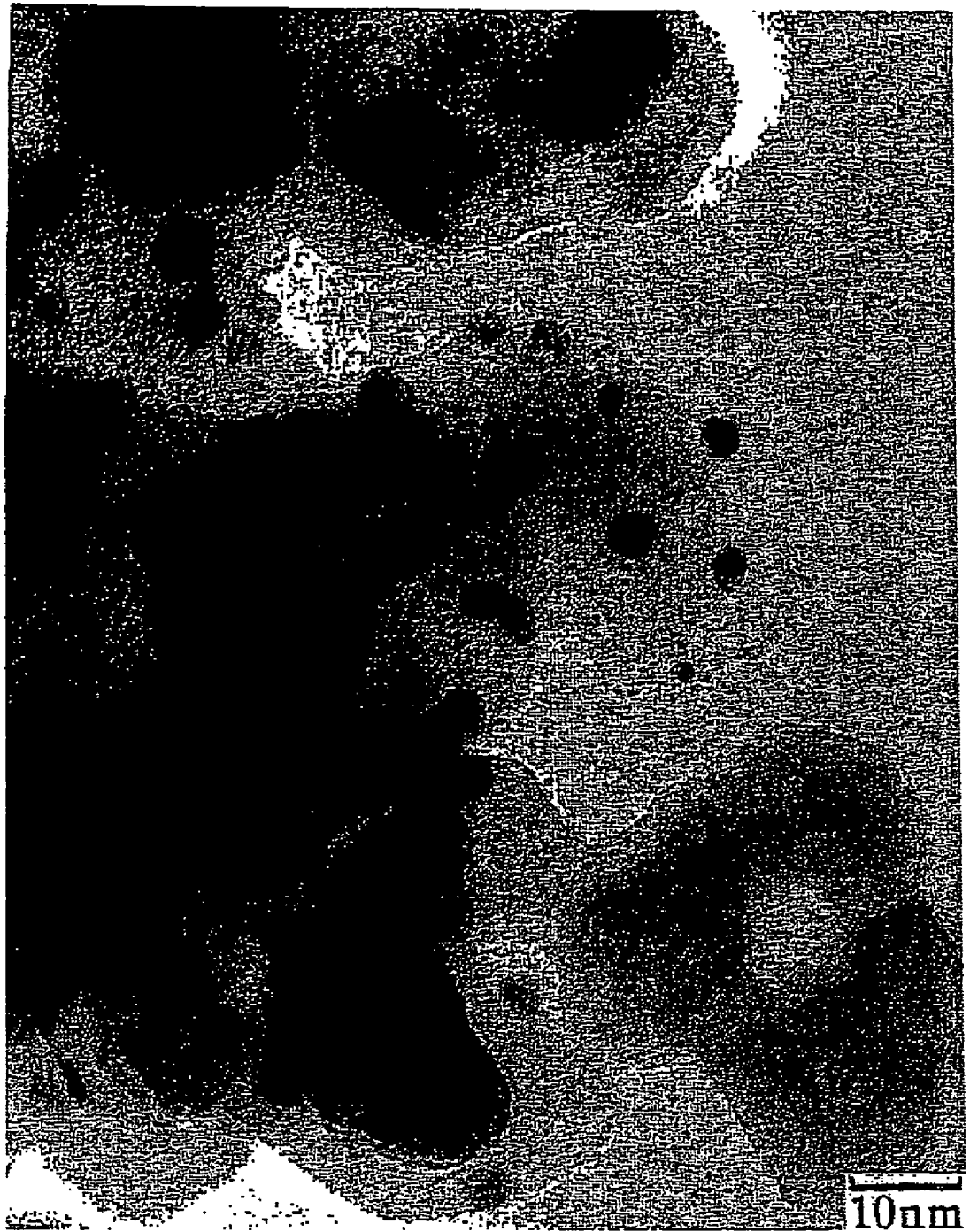
FIG. 7 is an image processed by TEM micrograph of the powder of Example 3 (after reduction treatment).
Figure 8:
FIG. 8 is an image processed by TEM micrograph of the powder of Example 3 (after reoxidation treatment).
Figure 9:
FIG. 9 is an image processed by TEM micrograph of a powder of Example 5 (after oxidation treatment).
Figure 10:
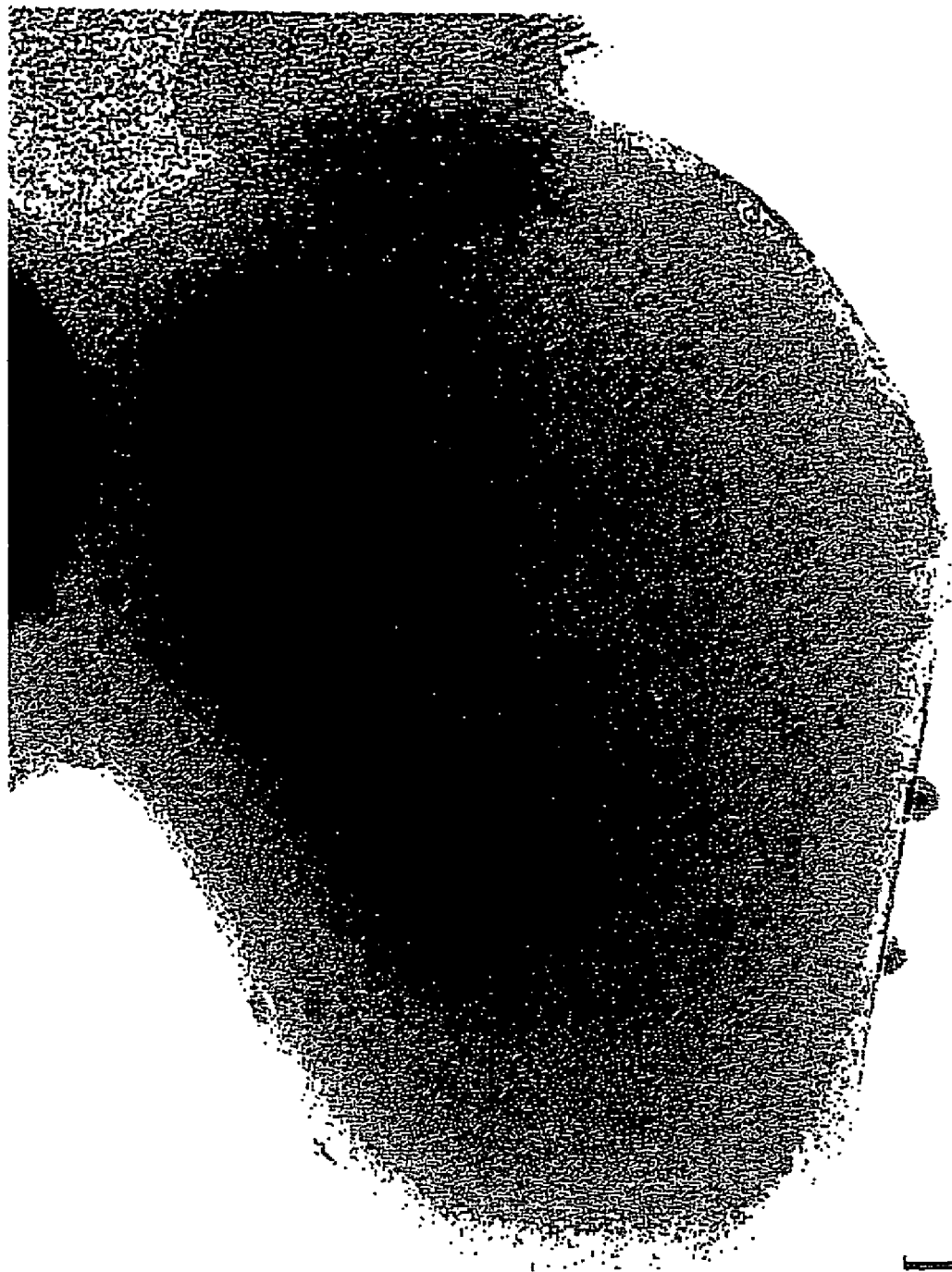
FIG. 10 is an image processed by TEM micrograph of the powder of Example 5 (after reduction treatment).
Figure 11:
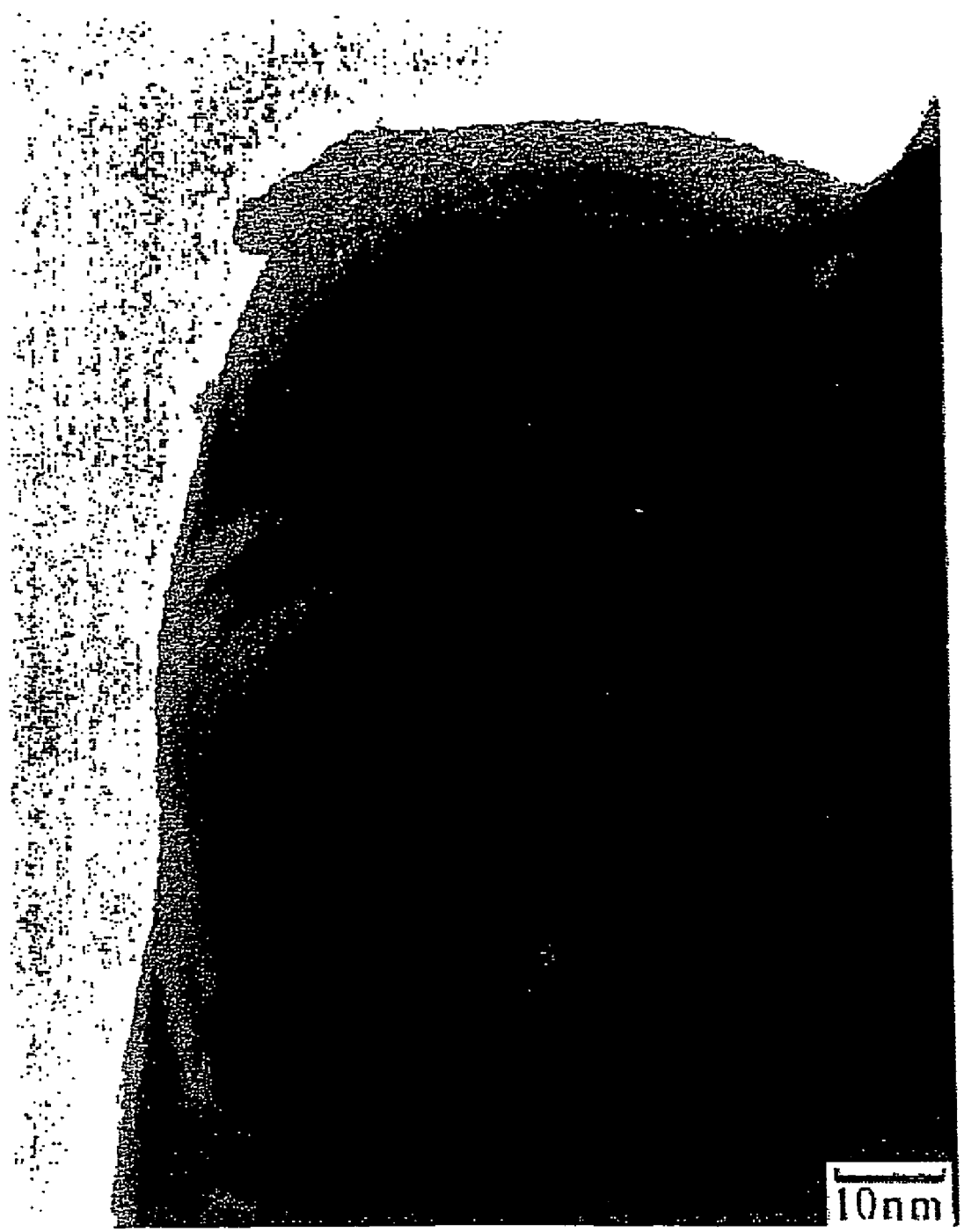
FIG. 11 is an image processed by TEM micrograph of the powder of Example 5 (after reoxidation treatment).
Figure 12:
FIG. 12 is an image processed by TEM micrograph of a powder of Example 8 (after oxidation treatment).
Figure 13:
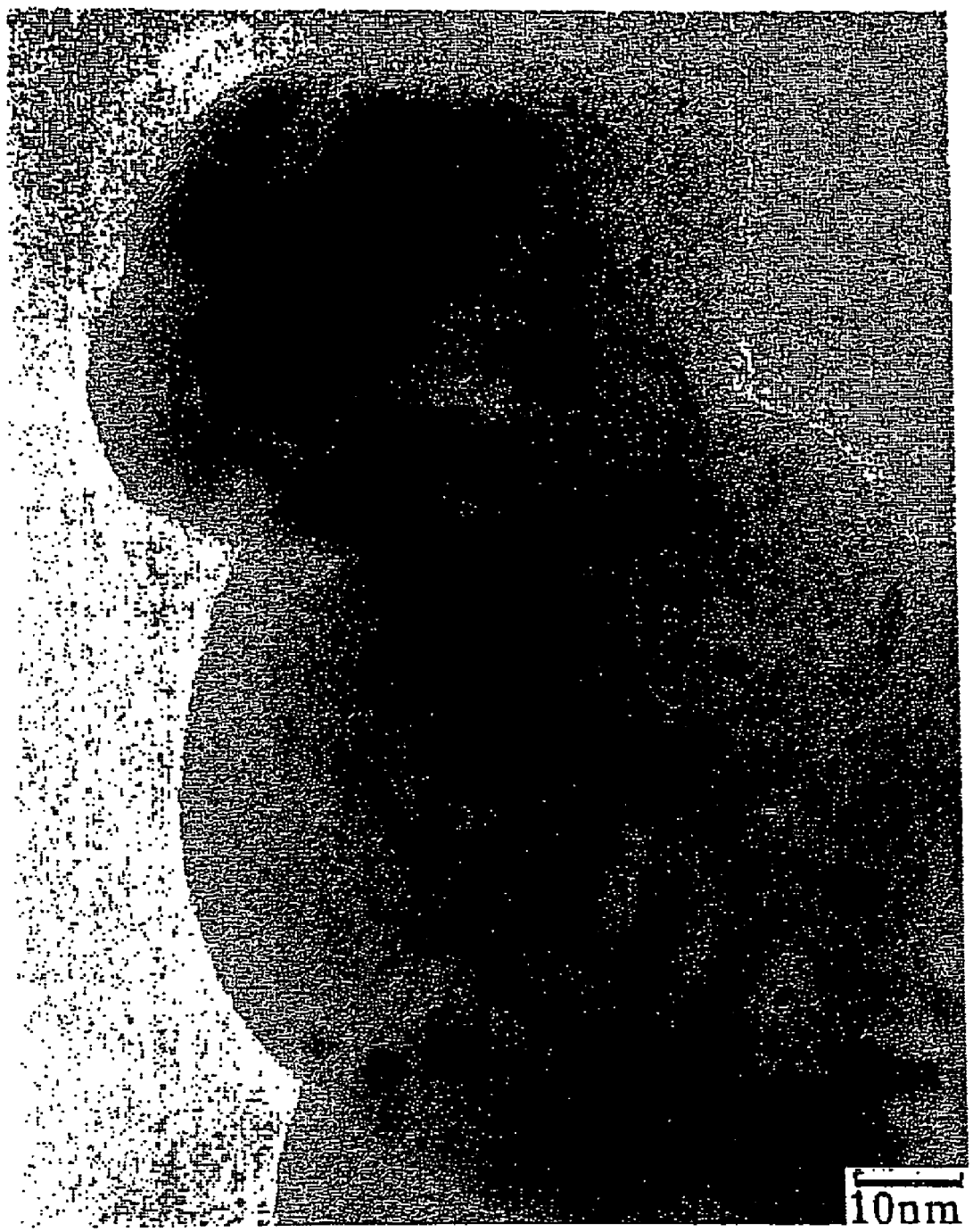
FIG. 13 is an image processed by TEM micrograph of the powder of Example 8 (after reduction treatment).
Figure 14:
FIG. 14 is an image processed by TEM micrograph of the powder of Example 8 (after reoxidation treatment).
Figure 15:
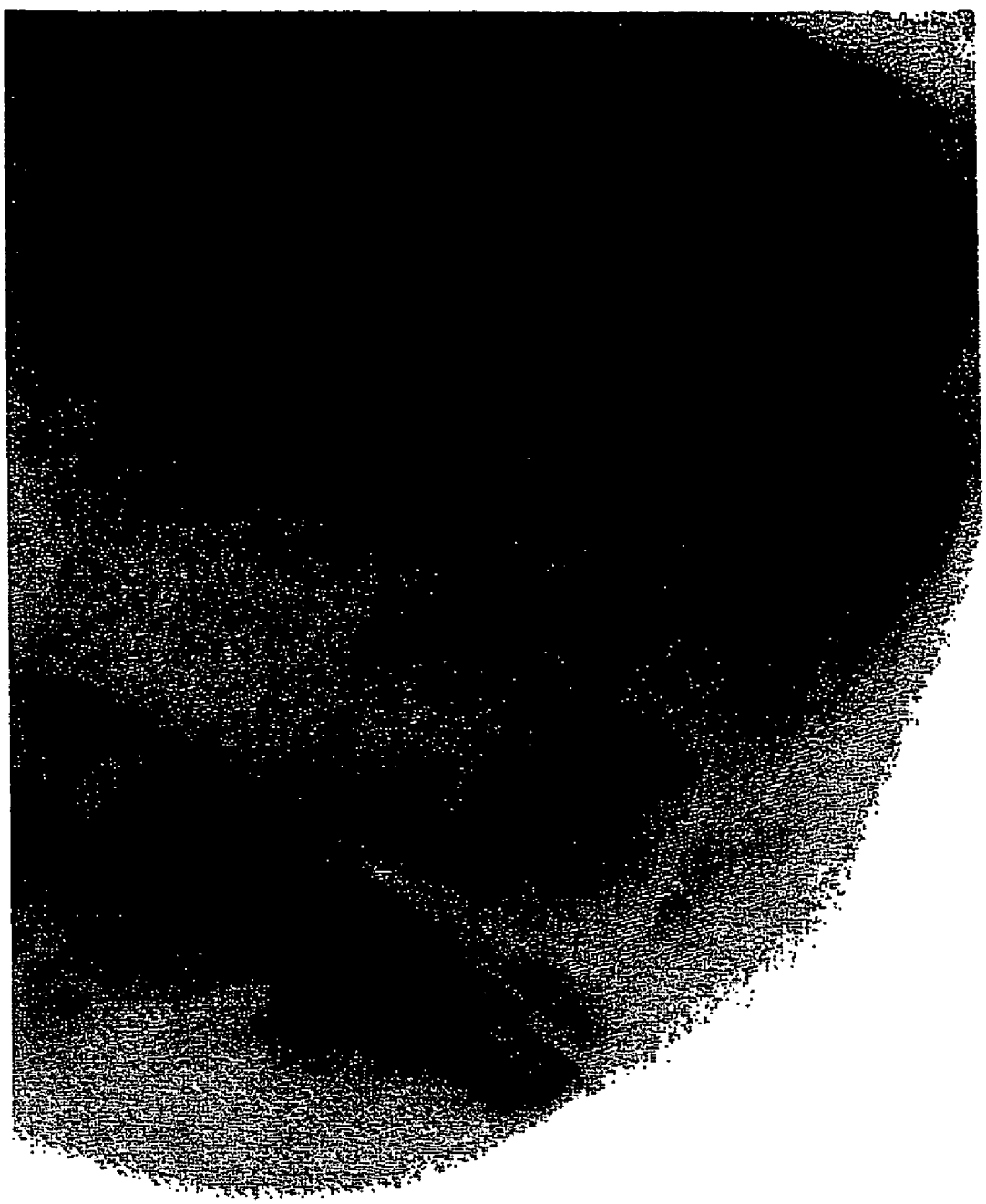
FIG. 15 is an image processed by TEM micrograph of a powder of Example 9 (after oxidation treatment).
Figure 16:
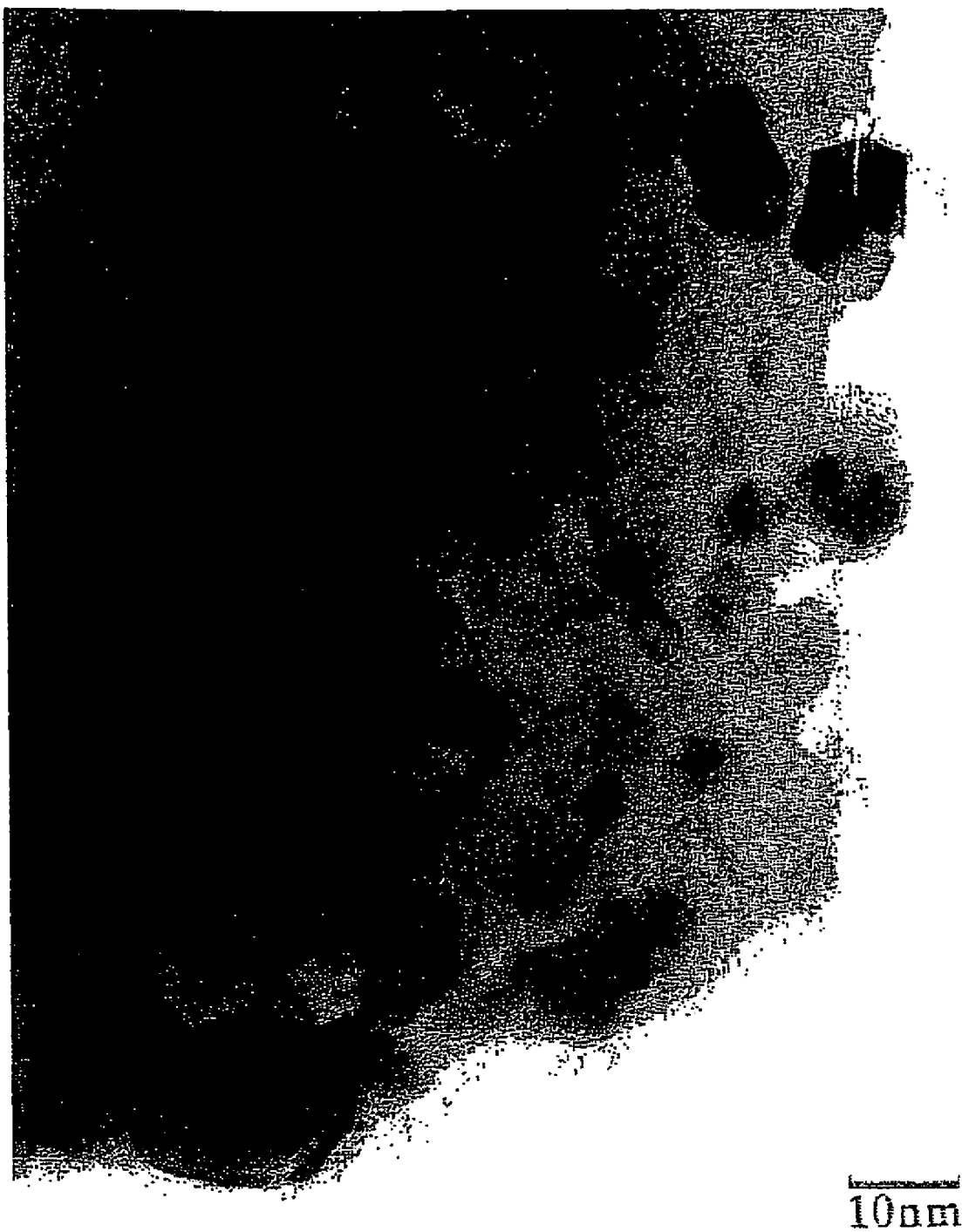
FIG. 16 is an image processed by TEM micrograph of the powder of Example 9 (after reduction treatment).
Figure 17:
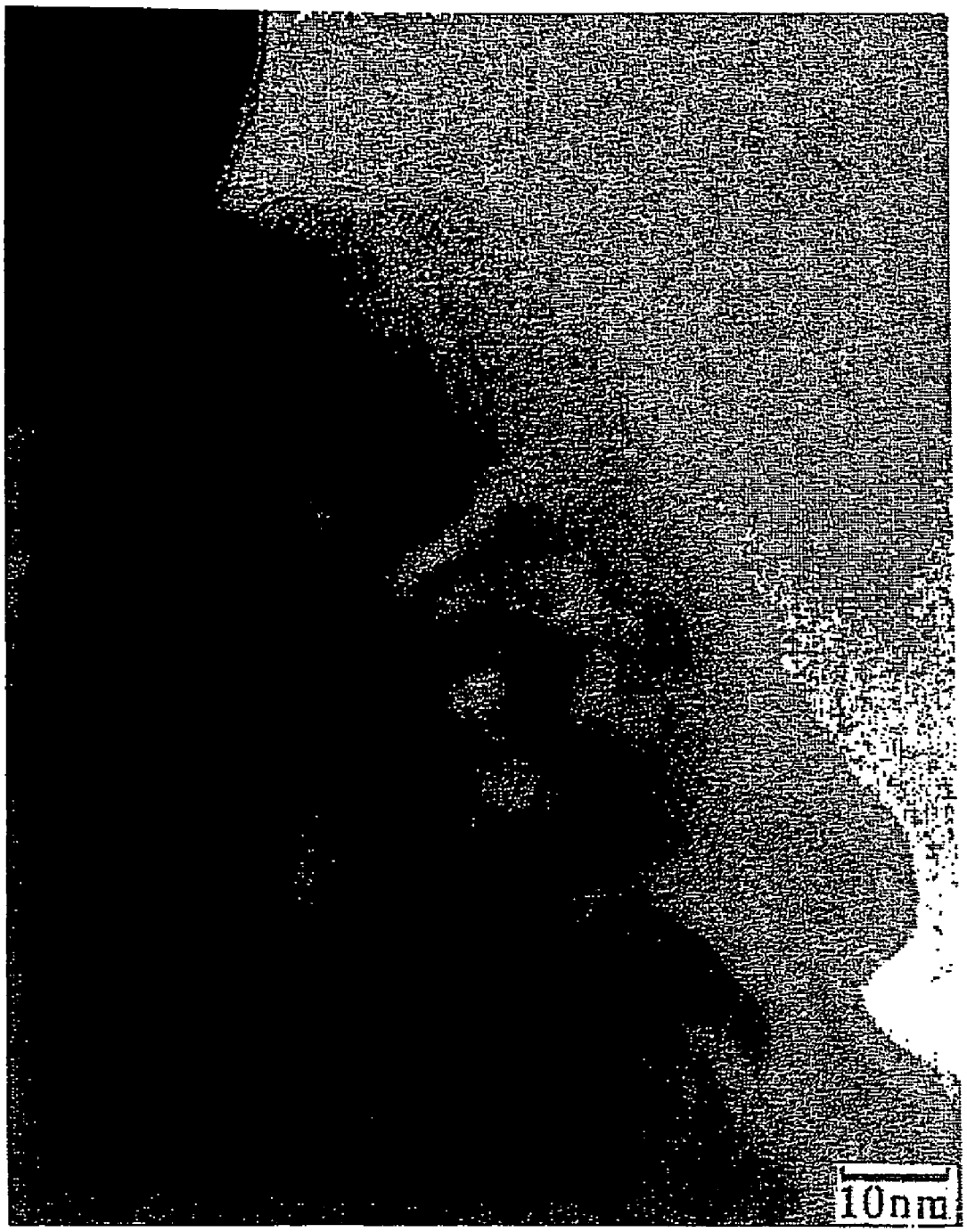
FIG. 17 is an image processed by TEM micrograph of the powder of Example 9 (after reoxidation treatment).
Figure 18:
FIG. 18 is an image processed by TEM micrograph of a powder of Example 10 (after oxidation treatment).
Figure 19:
FIG. 19 is an image processed by TEM micrograph of the powder of Example 10 (after reduction treatment).
Figure 20:
FIG. 20 is an image processed by TEM micrograph of the powder of Example 10 (after reoxidation treatment).
Figure 21:
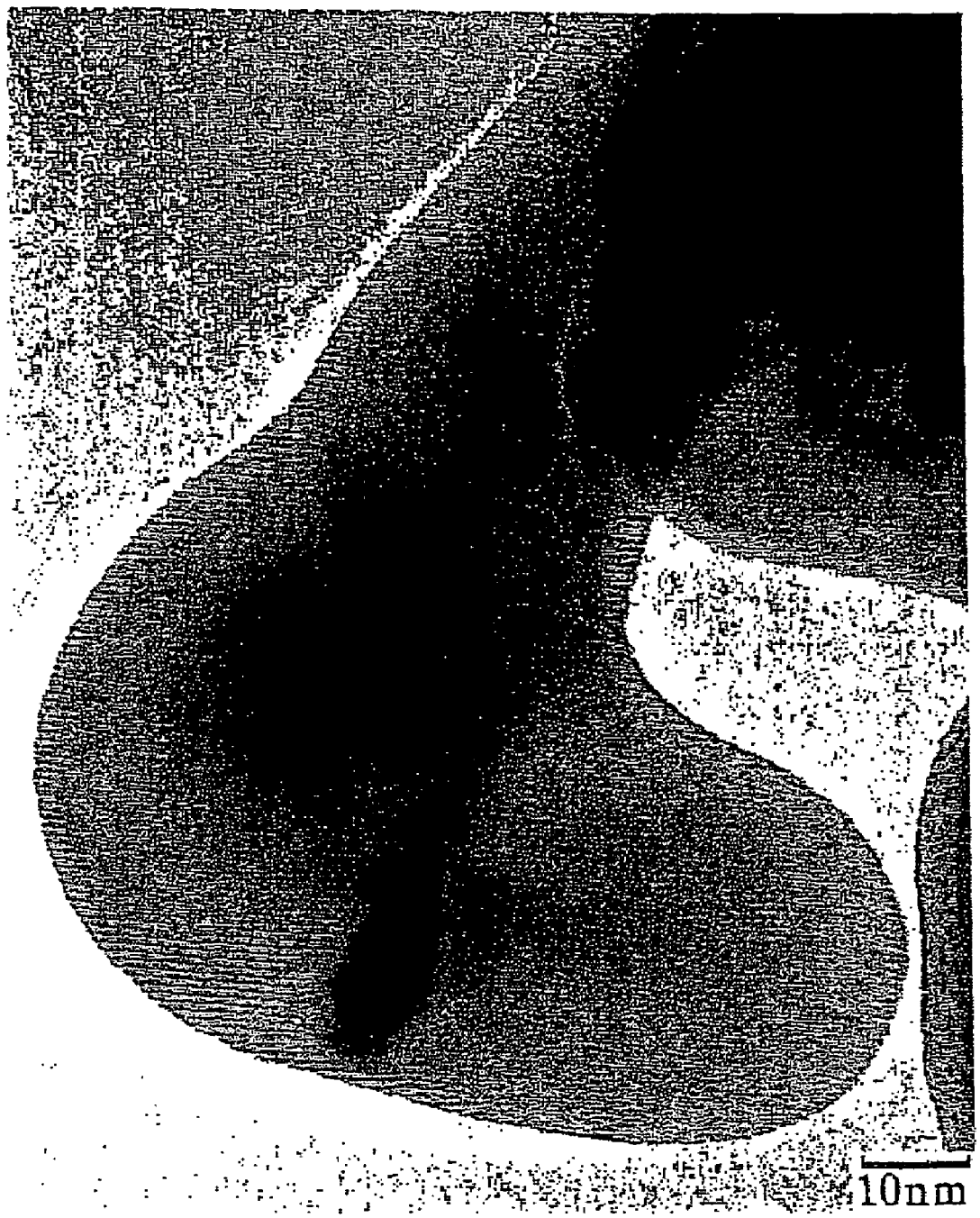
FIG. 21 is an image processed by TEM micrograph of a powder of Example 11 (after oxidation treatment).
Figure 22:
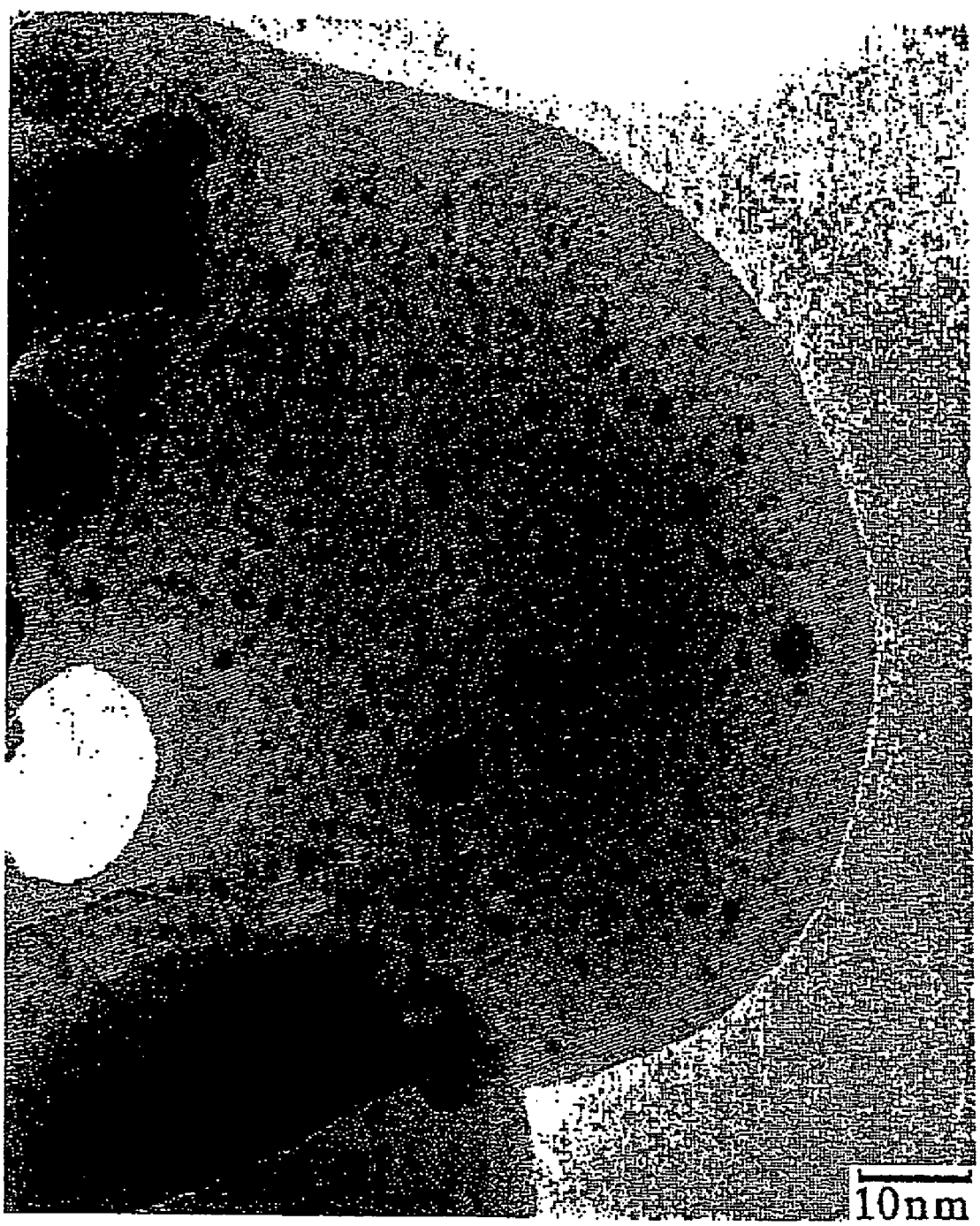
FIG. 22 is an image processed by TEM micrograph of the powder of Example 11 (after reduction treatment).
Figure 23:
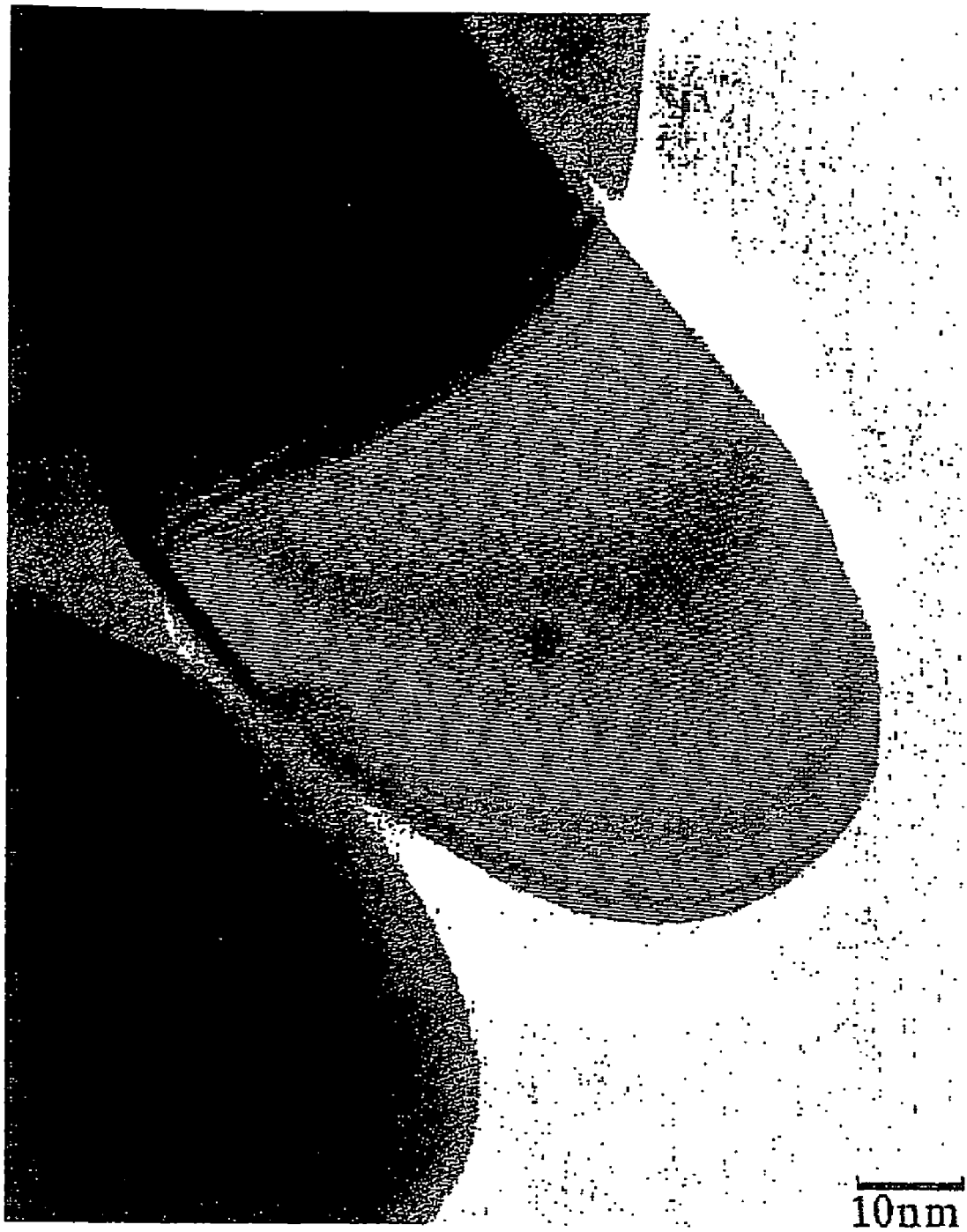
FIG. 23 is an image processed by TEM micrograph of the powder of Example 11 (after reoxidation treatment).

The X-ray diffraction analysis of the powder revealed that it was identified as a single crystal phase comprising a Pt-containing perovskite-type composite oxide having the composition of $CaTi_{0.98}Pt_{0.02}O_3$. Data of the X-ray diffraction are shown in FIG. 2.

Example 4

Production of $CaTi_{0.98}Rh_{0.01}Pt_{0.01}O_3$

| Calcium isopropoxide | 15.8 g (0.100 mol) |
|---|---|
| Titanium isopropoxide | 27.9 g (0.098 mol) |

After the above components were charged in a 500 mL round-bottomed flask and treated by the same procedure of Example 1, the obtained aqueous slurry was mixed with 2.06 g (Rh content: 5.00% by weight, 0.001 mol) of an aqueous rhodium nitrate solution and 4.24 g (Pt content: 4.60% by weight, 0.001 mol) of an aqueous dinitrodiammine platinum nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 800° C. in the air for 2 hours to obtain 13.5 g of a brown powder of an Rh—Pt-containing perovskite-type composite oxide having the composition of $CaTi_{0.98}Rh_{0.01}Pt_{0.01}O_3$ (Rh content: 0.75% by weight, Pt content: 1.41% by weight).

The X-ray diffraction analysis of the powder revealed that it was identified as a single crystal phase comprising a Rh—Pt-containing perovskite-type composite oxide having the composition of $CaTi_{0.98}Rh_{0.01}Pt_{0.01}O_3$.

Example 5

Production of $CaZr_{0.95}Rh_{0.05}O_3$

| | |
|---|---|
| Calcium isopropoxide | 15.8 g (0.100 mol) |
| Zirconium isopropoxide | 31.1 g (0.095 mol) |

After the above components were charged in a 500 mL round-bottomed flask and treated by the same procedure of Example 1, the obtained aqueous slurry was mixed with 10.29 g (Rh content: 5.00% by weight, 0.005 mol) of an aqueous rhodium nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 1000° C. in the air for 2 hours to obtain 17.6 g of a brown powder of an Rh-containing perovskite-type composite oxide having the composition of $CaZr_{0.95}Rh_{0.05}O_3$ (Rh content: 2.86% by weight).

The X-ray diffraction analysis of the powder revealed that it was identified as a single crystal phase comprising an Rh-containing perovskite-type composite oxide having the composition of $CaZr_{0.95}Rh_{0.05}O_3$.

Example 6

Production of $CaTi_{0.72}Zr_{0.24}Rh_{0.04}O_3$

| | |
|---|---|
| Calcium isopropoxide | 15.8 g (0.100 mol) |
| Titanium isopropoxide | 20.5 g (0.072 mol) |
| Zirconium isopropoxide | 7.9 g (0.024 mol) |

After the above components were charged in a 500 mL round-bottomed flask and treated by the same procedure of Example 1, the obtained aqueous slurry was mixed with 8.23 g (Rh content: 5.00% by weight. 0.004 mol) of an aqueous rhodium nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 900° C. in the air for 2 hours to obtain 14.5 g of a brown powder of an Rh-containing perovskite-type composite oxide having the composition of $CaTi_{0.72}Zr_{0.24}Rh_{0.04}O_3$ (Rh content: 2.77% by weight).

The X-ray diffraction analysis of the powder revealed that it was identified as a single crystal phase comprising an Rh-containing perovskite-type composite oxide having the composition of $CaTi_{0.72}Zr_{0.24}Rh_{0.04}O_3$.

Example 7

Production of $SrTi_{0.95}Rh_{0.05}O_3$

| | |
|---|---|
| Strontium isopropoxide | 20.6 g (0.100 mol) |
| Titanium isopropoxide | 27.0 g (0.095 mol) |

After the above components were charged in a 500 mL round-bottomed flask and treated by the same procedure of Example 1, the obtained aqueous slurry was mixed with 10.29 g (Rh content: 5.00% by weight, 0.005 mol) of an aqueous rhodium nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 800° C. in the air for 1 hour to obtain 18.0 g of a brown powder of an Rh-containing perovskite-type composite oxide having the composition of $SrTi_{0.95}Rh_{0.05}O_3$ (Rh content: 2.76% by weight).

The X-ray diffraction analysis of the powder revealed that it was identified as a single crystal phase comprising an Rh-containing perovskite-type composite oxide having the composition of $SrTi_{0.95}Rh_{0.05}O_3$.

Example 8

Production of $BaTi_{0.95}Pt_{0.05}O_3$

| | |
|---|---|
| Barium isopropoxide | 25.6 g (0.100 mol) |
| Titanium isopropoxide | 27.0 g (0.095 mol) |

After the above components were charged in a 500 mL round-bottomed flask and treated by the same procedure of Example 1, the obtained aqueous slurry was mixed with 21.21 g (Pt content: 4.60% by weight, 0.005 mol) of an aqueous dinitrodiammine platinum nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 800° C. in the air for 2 hours to obtain 18.6 g of a brown powder of a Pt-containing perovskite-type composite oxide having the composition of $BaTi_{0.95}Pt_{0.05}O_3$ (Pt content: 4.05% by weight).

The X-ray diffraction analysis of the powder revealed that it was identified as a single crystal phase comprising a Pt-containing perovskite-type composite oxide having the composition of $BaTi_{0.95}Pt_{0.05}O_3$.

Example 9

Production of $BaTi_{0.95}Rh_{0.05}O_3$

| | |
|---|---|
| Barium isopropoxide | 25.6 g (0.100 mol) |
| Titanium isopropoxide | 27.0 g (0.095 mol) |

After the above components were charged in a 500 mL round-bottomed flask and treated by the same procedure of Example 1, the obtained aqueous slurry was mixed with 10.29 g (Rh content: 5.00% by weight, 0.005 mol) of an aqueous rhodium nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 1000° C. in the air for 2 hours to obtain 23.0 g of a brown powder of an Rh-containing perovskite-type composite oxide having the composition of $BaTi_{0.95}Rh_{0.05}O_3$ (Rh content: 2.18% by weight).

The X-ray diffraction analysis of the powder revealed that it was identified as a single crystal phase comprising an Rh-containing perovskite-type composite oxide having the composition of $BaTi_{0.95}Rh_{0.05}O_3$.

Example 10

Production of $BaZr_{0.95}Rh_{0.05}O_3$

| | |
|---|---|
| Barium isopropoxide | 25.6 g (0.100 mol) |
| Zirconium isopropoxide | 31.1 g (0.095 mol) |

After the above components were charged in a 500 mL round-bottomed flask and treated by the same procedure of Example 1, the obtained aqueous slurry was mixed with 10.29 g (Rh content: 5.00% by weight, 0.005 mol) of an aqueous rhodium nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 1000° C. in the air for 2 hours to obtain 27.3 g of a brown powder of an Rh-containing perovskite-type composite oxide having the composition of $BaZr_{0.95}Rh_{0.05}O_3$ (Rh content: 1.86 by weight).

The X-ray diffraction analysis of the powder revealed that it was identified as a single crystal phase comprising an Rh-containing perovskite-type composite oxide having the composition of $BaZr_{0.95}Rh_{0.05}O_3$.

Example 11

Production of $Ca_{0.95}Mg_{0.05}Ti_{0.98}Rh_{0.02}O_3$

| | |
|---|---|
| Calcium methoxypropylate | 20.7 g (0.095 mol) |
| Magnesium methoxypropylate | 1.0 g (0.005 mol) |
| Titanium methoxypropylate | 39.6 g (0.098 mol) |

After the above components were charged in a 500 mL round-bottomed flask and treated by the same procedure of Example 1, the obtained aqueous slurry was mixed with 4.12 g (Rh content: 5.00% by weight, 0.002 mol) of an aqueous rhodium nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 800° C. in the air for 2 hours to obtain 13.3 g of a brown powder of an Rh-containing perovskite-type composite oxide having the composition of $Ca_{0.95}Mg_{0.05}Ti_{0.98}Rh_{0.02}O_3$ (Rh content: 1.51% by weight).

The X-ray diffraction analysis of the powder revealed that it was identified as a single crystal phase comprising an Rh-containing perovskite-type composite oxide having the composition of $Ca_{0.95}Mg_{0.05}Ti_{0.98}Rh_{0.02}O_3$.

Example 12

Production of $SrTi_{0.67}Al_{0.28}Rh_{0.05}O_3$

| | |
|---|---|
| Strontium isopropoxide | 20.6 g (0.100 mol) |
| Titanium isopropoxide | 19.0 g (0.067 mol) |
| Aluminum isopropoxide | 5.7 g (0.028 mol) |

After the above components were charged in a 500 mL round-bottomed flask and treated by the same procedure of Example 1, the obtained aqueous slurry was mixed with 10.29 g (Rh content: 5.00% by weight, 0.005 mol) of an aqueous rhodium nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 800° C. in the air for 2 hours to obtain 17.5 g of a brown powder of an Rh-containing perovskite-type composite oxide having the composition of $SrTi_{0.67}Al_{0.28}Rh_{0.05}O_3$ (Rh content: 2.85% by weight).

The X-ray diffraction analysis of the powder revealed that it was identified as a single crystal phase comprising an Rh-containing perovskite-type composite oxide having the composition of $SrTi_{0.67}Al_{0.28}Rh_{0.05}O_3$.

Example 13

Production of $Sr_{0.95}La_{0.05}Zr_{0.57}Ti_{0.38}Rh_{0.05}O_3$

| | |
|---|---|
| Strontium isopropoxide | 19.6 g (0.095 mol) |
| Lanthanum isopropoxide | 1.6 g (0.005 mol) |
| Zirconium isopropoxide | 18.7 g (0.057 mol) |
| Titanium isopropoxide | 10.8 g (0.038 mol) |

After the above components were charged in a 500 mL round-bottomed flask and treated by the same procedure of Example 1, the obtained aqueous slurry was mixed with 10.29 g (Rh content: 5.00% by weight, 0.005 mol) of an aqueous rhodium nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 800° C. in the air for 2 hours to obtain 20.9 g of a brown powder of an Rh-containing perovskite-type composite oxide having the composition of $Sr_{0.95}La_{0.05}Zr_{0.57}Ti_{0.38}Rh_{0.05}O_3$ (Rh content: 2.41% by weight).

The X-ray diffraction analysis of the powder revealed that it was identified as a single crystal phase comprising an Rh-containing perovskite-type composite oxide having the composition of $Sr_{0.95}La_{0.05}Zr_{0.57}Ti_{0.38}Rh_{0.05}O_3$.

Example 14

Production of SrZr$_{0.76}$Fe$_{0.20}$Rh$_{0.03}$Ru$_{0.01}$O$_3$

| | |
|---|---|
| Strontium methoxypropylate | 26.6 g (0.100 mol) |
| Zirconium methoxypropylate | 34.0 g (0.076 mol) |
| Iron methoxypropylate | 6.5 g (0.020 mol) |

After the above components were charged in a 500 mL round-bottomed flask and treated by the same procedure of Example 1, the obtained aqueous slurry was mixed with 6.17 g of an aqueous rhodium nitrate solution (Rh content: 5.00% by weight, 0.003 mol) and 2.11 g of an aqueous ruthenium nitrate solution (Ru content: 4.80% by weight, 0.001 mol) and stirred at room temperature for 1 hour.

Next, the resulting mixture was evaporated to dryness by distilling off water under reduced pressure to obtain a precursor. The precursor was subjected to a heat treatment (baking) in an electric furnace at 800° C. in the air for 2 hours to obtain 21.1 g of a brown powder of an Rh-containing perovskite-type composite oxide having the composition of SrZr$_{0.76}$Fe$_{0.20}$Rh$_{0.03}$Ru$_{0.01}$O$_3$ (Rh content: 1.40% by weight, Ru content: 0.46% by weight).

The X-ray diffraction analysis of the powder revealed that it was identified as a single crystal phase comprising an Rh-containing perovskite-type composite oxide having the composition of SrZr$_{0.76}$Fe$_{0.20}$Rh$_{0.03}$Ru$_{0.01}$O$_3$.

Example 15

Production of BaZr$_{0.76}$Fe$_{0.19}$Rh$_{0.05}$O$_3$

| | |
|---|---|
| Barium methoxypropylate | 31.6 g (0.100 mol) |
| Zirconium methoxypropylate | 34.0 g (0.076 mol) |
| Iron methoxypropylate | 6.1 g (0.019 mol) |

After the above components were charged in a 500 mL round-bottomed flask and treated by the same procedure of Example 1, the obtained aqueous slurry was mixed with 10.29 g (Rh content: 5.00% by weight, 0.005 mol) of an aqueous rhodium nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 1000° C. in the air for 2 hours to obtain 26.0 g of a brown powder of an Rh-containing perovskite-type composite oxide having the composition of BaZr$_{0.76}$Fe$_{0.19}$Rh$_{0.05}$O$_3$ (Rh content: 1.90% by weight).

The X-ray diffraction analysis of the powder revealed that it was identified as a single crystal phase comprising an Rh-containing perovskite-type composite oxide having the composition of BaZr$_{0.76}$Fe$_{0.19}$Rh$_{0.05}$O$_3$.

Example 16

Production of CaTi$_{0.99}$Rh$_{0.01}$O$_3$

| | |
|---|---|
| Calcium nitrate tetrahydrate | 23.6 g (0.100 mol) |
| Aqueous titanium chloride solution (Ti content: 10.1% by mass) | 47.0 g (0.099 mol) |

An aqueous mixed salt solution was prepared by charging the above components in a 500 mL round-bottomed flask adding 200 mL of deionized water and dissolving them with stirring. To the aqueous mixed salt solution 200.0 g (corresponding to 0.50 mol in terms of NaOH) of an aqueous 10% by weight sodium hydroxide solution prepared separately was added dropwise at room temperature to obtain a coprecipitate. The coprecipitate was further stirred for 2 hours, filtrated, and fully washed with deionized water.

The resulting coprecipitate was charged in a 500 mL round-bottomed flask, mixed with 2.06 g (Rh content: 5.00% by weight, 0.001 mol) of an aqueous rhodium nitrate solution and 100 mL of deionized water, and stirred at room temperature.

Next, the resulting mixture was evaporated to dryness by distilling off water under reduced pressure to obtain a precursor. The precursor was subjected to a heat treatment (baking) in an electric furnace at 800° C. in the air for 2 hours to obtain 13.4 g of a brown powder of an Rh-containing perovskite-type composite oxide having the composition of CaTi$_{0.99}$Rh$_{0.01}$O$_3$ (Rh content: 0.75% by weight).

The X-ray diffraction analysis of the powder revealed that it was identified as a single crystal phase comprising an Rh-containing perovskite-type composite oxide having the composition of CaTi$_{0.99}$Rh$_{0.01}$O$_3$.

Example 17

Production of BaZr$_{0.90}$Rh$_{0.10}$O$_3$

| | |
|---|---|
| Barium nitrate | 26.1 g (0.100 mol) |
| Oxyzirconium nitrate dehydrate | 24.1 g (0.090 mol) |

An aqueous mixed salt solution was prepared by charging the above components in a 500 mL round-bottomed flask and dissolving them in 200 mL of deionized water with stirring. To the aqueous mixed salt solution 192.0 g (corresponding to 0.48 mol in terms of NaOH) of an aqueous 10% by weight sodium hydroxide solution prepared separately was added dropwise at room temperature to obtain a coprecipitate. The coprecipitate was further stirred for 2 hours, filtrated, and fully washed with deionized water.

The resulting coprecipitate was charged in a 500 mL round-bottomed flask, mixed with 20.58 g (Rh content: 5.00% by weight, 0.010 mol) of an aqueous rhodium nitrate solution and 100 mL of deionized water, and stirred at room temperature.

Next, the resulting mixture was evaporated to dryness by distilling off water under reduced pressure to obtain a precursor. The precursor was subjected to a heat treatment (baking) in an electric furnace at 800° C. in the air for 2 hours to obtain 27.1 g of a brown powder of an Rh-containing perovskite-type composite oxide having the composition of BaZr$_{0.90}$Rh$_{0.10}$O$_3$ (Rh content: 3.71% by weight).

The X-ray diffraction analysis of the powder revealed that it was identified as a single crystal phase comprising an Rh-containing perovskite-type composite oxide having the composition of $BaZr_{0.90}Rh_{0.10}O_3$.

Example 18

Production of $Ca_{1.02}Ti_{0.95}Rh_{0.05}O_{3+\delta}$

| | |
|---|---|
| Calcium isopropoxide | 37.1 g (0.102 mol) |
| Titanium isopropoxide | 27.0 g (0.095 mol) |

After the above components were charged in a 500 mL round-bottomed flask and treated by the same procedure of Example 1, the obtained aqueous slurry was mixed with 10.29 g (Rh content: 5.00% by weight, 0.005 mol) of an aqueous rhodium nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 800° C. in the air for 2 hours to obtain 13.4 g of a brown powder of an Rh-containing perovskite-type composite oxide having the composition of $Ca_{1.02}Ti_{0.95}Rh_{0.05}O_{3+\delta}$ (Rh content: 3.69% by weight).

The X-ray diffraction analysis of the powder revealed that it was identified as a single crystal phase comprising an Rh-containing perovskite-type composite oxide having the composition of $Ca_{1.02}Ti_{0.95}Rh_{0.05}O_{3+\delta}$.

Example 19

Production of $Ca_{1.05}Ti_{0.98}Pt_{0.02}O_{3+\delta}$

| | |
|---|---|
| Calcium isopropoxide | 38.2 g (0.105 mol) |
| Titanium isopropoxide | 27.9 g (0.098 mol) |

After the above components were charged in a 500 mL round-bottomed flask and treated by the same procedure of Example 1, the obtained aqueous slurry was mixed with 8.48 g (Pt content: 4.60% by weight, 0.002 mol) of an aqueous dinitrodiammine platinum nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 700° C. in the air for 1 hour to obtain 13.8 g of a brown powder of a Pt-containing perovskite-type composite oxide having the composition of $Ca_{1.05}Ti_{0.98}Pt_{0.02}O_{3+\delta}$ (Pt content: 2.77% by weight).

The X-ray diffraction analysis of the powder revealed that it was identified as a single crystal phase comprising a Pt-containing perovskite-type composite oxide having the composition of $Ca_{1.05}Ti_{0.98}Pt_{0.02}O_{3+\delta}$.

Example 20

Production of $Sr_{1.1}Ti_{0.99}Pt_{0.01}O_{3+\delta}$

| | |
|---|---|
| Strontium isopropoxide | 22.6 g (0.110 mol) |
| Titanium isopropoxide | 28.1 g (0.099 mol) |

After the above components were charged in a 500 mL round-bottomed flask and treated by the same procedure of Example 1, the obtained aqueous slurry was mixed with 4.24 g (Pt content: 4.60% by weight, 0.001 mol) of an aqueous dinitrodiammine platinum nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 800° C. in the air for 1 hour to obtain 18.1 g of a brown powder of a Pt-containing perovskite-type composite oxide having the composition of $Sr_{1.1}Ti_{0.99}Pt_{0.01}O_{3+\delta}$ (Pt content: 1.01% by weight).

The X-ray diffraction analysis of the powder revealed that it was identified as a single crystal phase comprising a Pt-containing perovskite-type composite oxide having the composition of $Sr_{1.1}Ti_{0.99}Pt_{0.01}O_{3+\delta}$.

Example 21

Production of $Ba_{1.02}Ti_{0.99}Rh_{0.01}O_{3+\delta}$

| | |
|---|---|
| Barium isopropoxide | 26.1 g (0.102 mol) |
| Titanium isopropoxide | 28.1 g (0.099 mol) |

After the above components were charged in a 500 mL round-bottomed flask and treated by the same procedure of Example 1, the obtained aqueous slurry was mixed with 2.06 g (Rh content: 5.00% by weight, 0.001 mol) of an aqueous rhodium nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 1000° C. in the air for 2 hours to obtain 22.7 g of a brown powder of an Rh-containing perovskite-type composite oxide having the composition of $Ba_{1.02}Ti_{0.99}Rh_{0.01}O_{3+\delta}$ (Rh content: 0.44% by weight).

The X-ray diffraction analysis of the powder revealed that it was identified as a single crystal phase comprising an Rh-containing perovskite-type composite oxide having the composition of $Ba_{1.02}Ti_{0.99}Rh_{0.01}O_{3+\delta}$.

Example 22

Production of $Ba_{1.25}Ti_{0.95}Pt_{0.05}O_{3+\delta}$

| | |
|---|---|
| Barium nitrate | 32.7 g (0.125 mol) |
| Aqueous titanium chloride solution (Ti content: 10.1% by mass) | 45.1 g (0.095 mol) |

An aqueous mixed salt solution was prepared by charging the above components in a 500 mL round-bottomed flask and dissolving them in 200 mL of deionized water with stirring. To the aqueous mixed salt solution 200.0 g (corresponding to 0.50 mol in terms of NaOH) of an aqueous 10% by weight sodium hydroxide solution prepared separately was added dropwise at room temperature to obtain a coprecipitate. The coprecipitate was further stirred for 2 hours, filtrated, and fully washed with deionized water.

The resulting coprecipitate was charged in a 500 mL round-bottomed flask, mixed with 21.21 g (Pt content: 4.60% by weight, 0.005 mol) of an aqueous dinitrodiammine platinum nitrate solution and 100 mL of deionized water, and stirred at room temperature.

Next, the resulting mixture was evaporated to dryness by distilling off water under reduced pressure to obtain a precursor. The precursor was subjected to a heat treatment (baking) in an electric furnace at 800° C. in the air for 2 hours to obtain 25.8 g of a brown powder of a Pt-containing perovskite-type composite oxide having the composition of $Ba_{1.25}Ti_{0.95}Pt_{0.05}O_{3+\delta}$ (Pt content: 3.55% by weight).

The X-ray diffraction analysis of the powder revealed that it was identified as a single crystal phase comprising a Pt-containing perovskite-type composite oxide having the composition of $Ba_{1.25}Ti_{0.95}Pt_{0.05}O_{3+\delta}$.

Example 23

Production of $Ca_{1.02}Zr_{0.98}Pt_{0.02}O_{3+\delta}$

| | |
|---|---|
| Calcium isopropoxide | 16.1 g (0.102 mol) |
| Zirconium isopropoxide | 32.1 g (0.098 mol) |

After the above components were charged in a 500 mL round-bottomed flask and treated by the same procedure of Example 1, the obtained aqueous slurry was mixed with 8.48 g (Pt content: 4.60% by weight, 0.002 mol) of an aqueous dinitrodiammine platinum nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 1000° C. in the air for 2 hours to obtain 16.9 g of a brown powder of a Pt-containing perovskite-type composite oxide having the composition of $Ca_{1.02}Zr_{0.98}Pt_{0.02}O_{3+\delta}$ (Rh content: 2.14% by weight).

The X-ray diffraction analysis of the powder revealed that it was identified as a single crystal phase comprising a Pt-containing perovskite-type composite oxide having the composition of $Ca_{1.02}Zr_{0.98}Pt_{0.02}O_{3+\delta}$.

Example 24

Production of $Sr_{1.1}Ti_{0.95}Rh_{0.05}O_{3+\delta}$

| | |
|---|---|
| Strontium isopropoxide | 22.6 g (0.110 mol) |
| Titanium isopropoxide | 27.0 g (0.095 mol) |

After the above components were charged in a 500 mL round-bottomed flask and treated by the same procedure of Example 1, the obtained aqueous slurry was mixed with 10.29 g (Rh content: 5.00% by weight, 0.005 mol) of an aqueous rhodium nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 800° C. in the air for 1 hour to obtain 18.4 g of a brown powder of an Rh-containing perovskite-type composite oxide having the composition of $Sr_{1.1}Ti_{0.95}Rh_{0.05}O_{3+\delta}$ (Rh content: 2.64% by weight).

The X-ray diffraction analysis of the powder revealed that it was identified as a single crystal phase comprising an Rh-containing perovskite-type composite oxide having the composition of $Sr_{1.1}Ti_{0.95}Rh_{0.05}O_{3+\delta}$.

Example 25

Production of $Ba_{1.2}Zr_{0.97}Rh_{0.03}O_{3+\delta}$

| | |
|---|---|
| Barium nitrate | 31.4 g (0.120 mol) |
| Oxyzirconium nitrate dihydrate | 25.9 g (0.097 mol) |

An aqueous mixed salt solution was prepared by charging the above components in a 500 mL round-bottomed flask and dissolving them in 200 mL of deionized water with stirring. To the aqueous mixed salt solution 200.0 g (corresponding to 0.50 mol in terms of NaOH) of an aqueous 10% by weight sodium hydroxide solution prepared separately was added dropwise at room temperature to obtain a coprecipitate. The coprecipitate was further stirred for 2 hours, filtrated, and fully washed with deionized water.

The resulting coprecipitate was charged in a 500 mL round-bottomed flask, mixed with 21.21 g (Pt content: 4.60% by weight, 0.005 mol) of an aqueous dinitrodiammine platinum nitrate solution and 100 mL of deionized water, and stirred at room temperature.

Next, the resulting mixture was evaporated to dryness by distilling off water under reduced pressure to obtain a precursor. The precursor was subjected to a heat treatment (baking) in an electric furnace at 1000° C. in the air for 2 hours to obtain 28.3 g of a brown powder of an Rh-containing perovskite-type composite oxide having the composition of $Ba_{1.2}Zr_{0.97}Rh_{0.03}O_{3+\delta}$ (Rh content: 1.01% by weight).

The X-ray diffraction analysis of the powder revealed that it was identified as a single crystal phase comprising an Rh-containing perovskite-type composite oxide having the composition of $Ba_{1.2}Zr_{0.97}Rh_{0.03}O_{3+\delta}$.

Example 26

Production of $Ca_{1.05}Ti_{0.97}Rh_{0.02}Pt_{0.01}O_{3+\delta}$

| | |
|---|---|
| Calcium isopropoxide | 16.6 g (0.105 mol) |
| Titanium isopropoxide | 27.6 g (0.097 mol) |

After the above components were charged in a 500 mL round-bottomed flask and treated by the same procedure of Example 1, the obtained aqueous slurry was mixed with 4.12 g (Rh content: 5.00% by weight, 0.002 mol) of an aqueous rhodium nitrate solution and 4.24 g (Pt content: 4.60% by weight, 0.001 mol) of an aqueous dinitrodiammine platinum nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 800° C. in the air for 1 hour to obtain 13.4 g of a brown powder of an Rh—Pt-containing perovskite-type composite oxide having the composition of $Ca_{1.05}Ti_{0.97}Rh_{0.02}Pt_{0.01}O_{3+\delta}$ (Rh content: 1.46% by weight, Pt content: 1.39% by weight).

The X-ray diffraction analysis of the powder revealed that it was identified as a single crystal phase comprising an Rh—Pt-containing perovskite-type composite oxide having the composition of $Ca_{1.05}Ti_{0.97}Rh_{0.02}Pt_{0.01}O_{3+\delta}$.

Example 27

Production of $Ca_{1.1}Zr_{0.95}Rh_{0.05}O_{3+\delta}$

| | |
|---|---|
| Calcium isopropoxide | 17.4 g (0.110 mol) |
| Zirconium isopropoxide | 31.1 g (0.095 mol) |

After the above components were charged in a 500 mL round-bottomed flask and treated by the same procedure of Example 1, the obtained precipitate was filtrated, fully washed with deionized water, dried under air flow at 60° C. for 24 hours and subjected to a heat treatment (baking) in an electric furnace at 800° C. in the air for 1 hour to obtain a powder of a perovskite-type composite oxide having the composition of $CaZrO_3$.

The obtained powder was impregnated with 10.29 g (Rh content: 5.00% by weight, 0.005 mol) of an aqueous rhodium nitrate solution, dried under air flow at 60° C. for 24 hours and subjected to a heat treatment (baking) in an electric furnace at 800° C. in the air for 1 hour to obtain 16.9 g of a brown powder of an Rh-containing perovskite-type composite oxide having the composition of $Ca_{1.1}Zr_{0.95}Rh_{0.05}O_{3+\delta}$ (Rh content: 2.80% by weight).

The X-ray diffraction analysis of the powder revealed that it was identified as a single crystal phase comprising an Rh-containing perovskite-type composite oxide having the composition of $Ca_{1.1}Zr_{0.95}Rh_{0.05}O_{3+\delta}$.

Comparative Example 1

Production of $La_{0.95}Sr_{0.05}Al_{0.90}Co_{0.05}Pt_{0.05}O_3$

| | |
|---|---|
| Lanthanum isopropoxide | 30.0 g (0.095 mol) |
| Strontium isopropoxide | 1.0 g (0.005 mol) |
| Aluminum isopropoxide | 18.4 g (0.090 mol) |
| Cobalt isopropoxide | 0.9 g (0.005 mol) |

After the above components were charged in a 500 mL round-bottomed flask and treated by the same procedure of Example 1, the obtained aqueous slurry was mixed with 21.21 g (Pt content: 4.60% by weight, 0.005 mol) of an aqueous dinitrodiammine platinum nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 800° C. in the air for 2 hours to obtain 21.8 g of a brown powder of a Pt-containing perovskite-type composite oxide having the composition of $La_{0.95}Sr_{0.05}Al_{0.90}Co_{0.05}Pt_{0.05}O_3$ (Pt content: 4.41% by weight).

The X-ray diffraction analysis of the powder revealed that it was identified as a single crystal phase comprising a Pt-containing perovskite-type composite oxide having the composition of $La_{0.95}Sr_{0.05}Al_{0.90}Co_{0.05}Pt_{0.05}O_3$.

Comparative Example 2

Production of $PrFe_{0.90}Co_{0.05}Rh_{0.05}O_3$

| | |
|---|---|
| Praseodymium methoxypropylate | 40.8 g (0.100 mol) |
| Iron methoxypropylate | 29.1 g (0.090 mol) |
| Cobalt methoxypropylate | 1.2 g (0.005 mol) |

After the above components were charged in a 500 mL round-bottomed flask and treated by the same procedure of Example 1, the obtained aqueous slurry was mixed with 10.29 g (Rh content: 5.00% by weight, 0.005 mol) of an aqueous rhodium nitrate solution and stirred at room temperature for 1 hour.

Next, the resulting mixture was evaporated to dryness by distilling off water under reduced pressure to obtain a precursor. The precursor was subjected to a heat treatment (baking) in an electric furnace at 800° C. in the air for 2 hours to obtain 24.1 g of a brown powder of an Rh-containing perovskite-type composite oxide having the composition of $PrFe_{0.90}CO_{0.05}Rh_{0.05}O_3$ (Rh content: 2.08% by weight).

The X-ray diffraction analysis of the powder revealed that it was identified as a single crystal phase comprising an Rh-containing perovskite-type composite oxide having the composition of $PrFe_{0.90}Cu_{0.05}Rh_{0.05}O_3$.

Comparative Example 3

A total of 20 g of a commercially available alpha-alumina having a specific surface area of 13.2 m$^2$/g was impregnated with Rh supporting 9.1 g (corresponding to 0.41 g of Rh) of an aqueous rhodium nitrate solution having an Rh content of 4.48% by mass, subjected to forced-air drying at 60° C. for 24 hours and then subjected to heat treatment in an electric furnace at 500° C. in the air for 1 hour to obtain a powder of an Rh-supporting alpha-alumina (Rh content: 2.00% by weight).

Comparative Example 4

A total of 20 g of a commercially available alpha-alumina having a specific surface area of 13.2 m$^2$/g was impregnated with Pt supporting 4.8 g (corresponding to 0.41 g of Pt) of an aqueous dinitrodiammine platinum nitrate solution having a Pt content of 8.50% by mass, subjected to forced-air drying at 60° C. for 24 hours and then subjected to heat treatment in an electric furnace at 500° C. in the air for 1 hour to obtain a powder of a Pt-supporting alpha-alumina (Pt content: 2.00% by weight).

Test Example 1

Test on Physical Properties

1) Measurement of Specific Surface Area

Specific surface areas of the powders obtained in Examples 1 to 17 and the respective Comparative Examples were measured by a BET process. The results are shown in Table 1.

2) Observation by Transmission Electron Microscope (TEM).

The respective powders prepared in Examples 1, 3, 5, 8, 9 and 10 were subjected to an oxidation treatment (heat treatment in the air at 800° C. for 1 hour), then a reduction treatment (heat treatment in an $N_2$ gas containing 10% of $H_2$ at 800° C. for 1 hour) and then a reoxidation treatment (heat treatment in the air at 800° C. for 1 hour). After each of the reduction treatment and the reoxidation treatment, the respective powders were observed using a transmission electron microscope (TEM). The results are shown in FIGS. 3 to 23.

As is apparent from the results shown in FIGS. 3 to 23, a state was observed where Rh or Pt constituted a solid solution in a perovskite-type crystal structure of the respective powders after the oxidation treatment. A state was observed where Rh or Pt was deposited from a perovskite-type crystal structure of the respective powders after the reduction treatment. A state was also observed where Rh or Pt constituted a solid solution again in a perovskite-type crystal structure of the respective powders after the reoxidation treatment.

These facts revealed that the respective powders can exert a self-regenerative function, in which noble metals repetitively form solid solution under an oxidative atmosphere and deposit under a reducing atmosphere.

3) Measurement of Amount of Solid Solution of Noble Metal

After each of the oxidation treatment and the reduction treatment, the powders obtained in Examples 1 to 17 and the Comparative Examples were dissolved in an aqueous 7% by weight hydrofluoric acid (an aqueous 5% by weight hydrochloric acid in Example 8, Example 9, Comparative Example 1 and Comparative Example 2). After being stood at room temperature for 20 hours, the respective resulting solutions were filtered through a filter having a pore size of 0.1 μmφ. Amounts of the noble metals dissolved in the filtrate were determined by inductively coupled plasma (ICP) emission spectroscopy and quantitative analysis of the noble metals in the residue was carried out by an X-ray diffraction (XRD)-scanning electron microscopy (SEM) analytical method. From these results, the amounts of solid solutions of the noble metals after the oxidation treatment and the reduction treatment was calculated. From differences between the amounts of the solid solutions of the noble metals after the oxidation treatment and the amounts of the solid solutions of the noble metals after the reduction treatment, amounts of the deposited noble metal was calculated. The results are shown in Table 1.

In the above method, the residue of a fluoride (calcium fluoride, etc.) was produced during dissolving the respective powders in an aqueous 7% by weight fluorohydric acid solution. However, since the noble metals constituting solid solutions in perovskite-type crystal structures were dissolved, proportions of the noble metals constituting the solid solutions in the perovskite-type crystal structures could be determined.

Test Example 2

Endurance Test

1) Oxidation-Reduction Endurance Test

The powders obtained in Examples 1 to 17 and the Comparative Examples were alternately exposed to an oxidative atmosphere and a reducing atmosphere and then cooled to room temperature under the reducing atmosphere. In this test, a cycle for a total of 30 minutes comprising 5 minutes in an inert atmosphere, 10 minutes in an oxidative atmosphere, 5 minutes in an inert atmosphere and 10 minutes in a reducing atmosphere was repeated 20 times, for a total of 10 hours.

The inert atmosphere, the oxidative atmosphere or the reducing atmosphere correspond to an exhaust gas atmosphere to be discharged when a gaseous mixture is burned in a stoichiometric, lean or rich state.

Each atmosphere was prepared by feeding the gases having the compositions shown in Table 2, which contains high temperature steam, at a flow rate of 300 $10^{-3}$ $m^3$/hr. The atmosphere temperature was maintained at about 1000° C.

2) Evaluation of Activity

While circulating a gas containing 4% NO and 6% $H_2$ (balance: He) at a flow rate of 50 mL/min., 40 mg of each powder subjected to the above oxidation-reduction endurance test was heated from room temperature to 400° C. at a heating rate of 3° C./min. During heating, a signal of NO (mass: 30) was observed by a mass spectrometer and the temperature at which the number of counts reduced by 30% as compared with that at room temperature was taken as a NO 30% purifying temperature.

3) Test on Reproducibility

The operations in Example 7, and 18 to 27 were repeated respectively three times, to obtain powders each having an amount for three tests. With respect to each powder, amounts of solid solutions of the noble metals after the oxidation treatment was calculated according to Test Example 1-3) "Measurement of amount of solid solution of noble metal". The results are shown in Table 3.

TABLE 1

| Examples/Comparative Examples | Composition | Noble metal content (% by weight) | Preparation process | Specific surface area ($m^2$/g) | Amount of solid solution of noble metal (%) | | Deposition amount (oxidation-reduction) | NO 30% purifying temperature (° C.) |
|---|---|---|---|---|---|---|---|---|
| | | | | | Oxidation | Reduction | | |
| Example 1 | $CaTi_{0.95}Rh_{0.05}O_3$ | 3.71 | Alkoxide | 9.3 | 100 | 22 | 78 | 223 |
| Example 2 | $CaTi_{0.98}Rh_{0.02}O_3$ | 1.50 | Alkoxide | 48 | 98 | 24 | 74 | 236 |
| Example 3 | $CaTi_{0.98}Pt_{0.02}O_3$ | 2.81 | Alkoxide | 14 | 100 | 0 | 100 | 121 |
| Example 4 | $CaTi_{0.98}Rh_{0.01}Pt_{0.01}O_3$ | 0.75/1.41 | Alkoxide | 24 | 98/100 | 11/0 | 87/100 | 132 |
| Example 5 | $CaZr_{0.95}Rh_{0.05}O_3$ | 2.86 | Alkoxide | 2.3 | 99 | 39 | 60 | 260 |
| Example 6 | $CaTi_{0.72}Zr_{0.24}Rh_{0.04}O_3$ | 2.77 | Alkoxide | 18 | 98 | 25 | 73 | 243 |
| Example 7 | $SrTi_{0.95}Rh_{0.05}O_3$ | 2.76 | Alkoxide | 20 | 86 | 24 | 61 | 233 |
| Example 8 | $BaTi_{0.95}Pt_{0.05}O_3$ | 4.05 | Alkoxide | 17 | 100 | 28 | 72 | 155 |
| Example 9 | $BaTi_{0.95}Rh_{0.05}O_3$ | 2.18 | Alkoxide | 1.1 | 100 | 0 | 100 | 223 |
| Example 10 | $BaZr_{0.95}Rh_{0.05}O_3$ | 1.86 | Alkoxide | 3.6 | 99 | 35 | 64 | 252 |
| Example 11 | $Ca_{0.95}Mg_{0.05}Ti_{0.98}Rh_{0.02}O_3$ | 1.51 | Alkoxide | 21 | 89 | 29 | 60 | 245 |
| Example 12 | $SrTi_{0.67}Al_{0.28}Rh_{0.05}O_3$ | 2.85 | Alkoxide | 18 | 95 | 42 | 54 | 242 |
| Example 13 | $Sr_{0.95}La_{0.05}Zr_{0.57}Ti_{0.38}Rh_{0.05}O_3$ | 2.41 | Alkoxide | 13 | 90 | 39 | 51 | 253 |

TABLE 1-continued

| Examples/Comparative Examples | Composition | Noble metal content (% by weight) | Preparation process | Specific surface area (m²/g) | Amount of solid solution of noble metal (%) Oxidation | Amount of solid solution of noble metal (%) Reduction | Deposition amount (oxidation-reduction) | NO 30% purifying temperature (° C.) |
|---|---|---|---|---|---|---|---|---|
| Example 14 | $SrZr_{0.76}Fe_{0.20}Rh_{0.03}Ru_{0.01}O_3$ | 1.40/0.46 | Alkoxide | 16 | 94/66 | 37/0 | 57/66 | 265 |
| Example 15 | $BaZr_{0.76}Fe_{0.19}Rh_{0.05}O_3$ | 1.90 | Alkoxide | 21 | 93 | 37 | 56 | 267 |
| Example 16 | $CaTi_{0.99}Rh_{0.01}O_3$ | 0.75 | Coprecipitation process | 6.8 | 74 | 22 | 52 | 251 |
| Example 17 | $BaZr_{0.90}Rh_{0.10}O_3$ | 3.71 | Coprecipitation process | 4.6 | 91 | 41 | 50 | 269 |
| Comparative Example 1 | $La_{0.95}Sr_{0.05}Al_{0.90}Co_{0.05}Pt_{0.05}O_3$ | 4.41 | Alkoxide | 11 | 99 | 71 | 28 | 318 |
| Comparative Example 2 | $PrFe_{0.90}Co_{0.05}Rh_{0.05}O_3$ | 2.08 | Alkoxide | 6.5 | 23 | 15 | 8 | 285 |
| Comparative Example 3 | $Rh/Al_2O_3$ (α) | 2.00 | Supporting process | 13 | 0 | 0 | 0 | 353 |
| Comparative Example 4 | $Pt/Al_2O_3$ (α) | 2.00 | Supporting process | 13 | 0 | 0 | 0 | >400 |

TABLE 2

| | Oxidation atmosphere (vol %) | Inert atmosphere (vol %) | Reducing atmosphere (vol %) |
|---|---|---|---|
| $H_2$ | — | — | 0.5 |
| CO | — | — | 1.5 |
| $O_2$ | 1.0 | — | — |
| $CO_2$ | 8.0 | 8.0 | 8.0 |
| $H_2O$ | 10 | 10 | 10 |
| $N_2$ | 81 | 82 | 80 |

TABLE 3

| Examples | Composition | Noble metal content (g/L catalyst) | Preparation process | Ratio of A/B | Rate of solid solution of noble metal (%) First time | Rate of solid solution of noble metal (%) Second time | Rate of solid solution of noble metal (%) Third time |
|---|---|---|---|---|---|---|---|
| Example 7 | $SrTi_{0.96}Rh_{0.05}O_3$ | 2.76 | Alkoxide | 1 | 86 | 42 | 59 |
| Example 18 | $Ca_{1.02}Ti_{0.95}Rh_{0.05}O_{3+\delta}$ | 3.69 | Alkoxide | 1.02 | 94 | 93 | 96 |
| Example 19 | $Ca_{1.05}Ti_{0.98}Pt_{0.02}O_{3+\delta}$ | 2.77 | Alkoxide | 1.05 | 94 | 95 | 94 |
| Example 20 | $Sr_{1.1}Ti_{0.99}Pt_{0.01}O_{3+\delta}$ | 1.01 | Alkoxide | 1.1 | 86 | 88 | 83 |
| Example 21 | $Ba_{1.02}Ti_{0.99}Rh_{0.01}O_{3+\delta}$ | 0.44 | Alkoxide | 1.02 | 83 | 79 | 82 |
| Example 22 | $Ba_{1.25}Ti_{0.95}Pt_{0.05}O_{3+\delta}$ | 3.55 | Coprecipitation | 1.25 | 79 | 82 | 84 |
| Example 23 | $Ca_{1.02}Zr_{0.98}Pt_{0.02}O_{3+\delta}$ | 2.14 | Alkoxide | 1.02 | 85 | 88 | 87 |
| Example 24 | $Sr_{1.1}Ti_{0.95}Rh_{0.05}O_{3+\delta}$ | 2.64 | Alkoxide | 1.1 | 93 | 91 | 90 |
| Example 25 | $Ba_{1.2}Zr_{0.97}Rh_{0.03}O_{3+\delta}$ | 1.01 | Coprecipitation | 1.2 | 83 | 85 | 81 |
| Example 26 | $Ca_{1.05}Ti_{0.97}Rh_{0.02}Pt_{0.01}O_{3+\delta}$ | 1.46/1.39 | Alkoxide | 1.05 | 94/92 | 93/92 | 95/94 |
| Example 27 | $Ca_{1.1}Zr_{0.95}Rh_{0.05}O_{3+\delta}$ | 2.80 | Alkoxide + post solid solution | 1.1 | 82 | 84 | 79 |

While the illustrative embodiments and examples of the present invention are provided in the above description, such is for illustrative purpose only and it is not to be construed restrictively. Modification and variation of the present invention which will be obvious to those skilled in the art is to be covered in the following claims.

INDUSTRIAL APPLICABILITY

The catalyst composition of the present invention can be widely used as a catalyst for vapor or liquid phase reaction, can exhibit satisfactory catalytic performance over a long time and is therefore advantageously usable as an exhaust gas purifying catalyst for purifying emissions discharged from internal combustion engines such as gasoline and diesel engines, and boilers.

The invention claimed is:

1. A catalyst composition comprising a perovskite-type composite oxide represented by the following general formula (1):

wherein A represents at least one element selected from the group consisting of alkaline earth metals;

A' represents at least one element selected from the group consisting of rare earth elements;

B represents Ti;

B' represents at least one element selected from the group consisting of transition elements (excluding rare earth elements, Ti, Rh, and Pt) and Al;

N represents at least one element selected from the group consisting of Rh and Pt;

x represents an atomic ratio satisfying the following condition: $0 \leq x \leq 0.4$;

y represents an atomic ratio satisfying the following condition: $0 \leq y < 0.5$;

z represents an atomic ratio satisfying the following condition: $0 < z \leq 0.5$; and x represents 0 when N represents Pt alone;

wherein A represents at least one element selected from the group consisting of Ca, Sr, and Ba in the general formula (1); and wherein y represents 0 in the general formula (1).

2. A catalyst composition comprising a perovskite-type composite oxide represented by the following general formula (2):

$$AB_{1-z}N_zO_3 \qquad (2)$$

wherein A represents at least one element selected from the group consisting of Ca, Sr and Ba;

B represents Ti;

N represents at least one element selected from the group consisting of Rh and Pt; and z represents an atomic ratio satisfying the following condition: $0<z\leqq0.5$.

3. A catalyst composition comprising a perovskite-type composite oxide represented by the following general formula (3):

$$AB_{1-z}Rh_zO_3 \qquad (3)$$

wherein A represents at least one element selected from the group consisting of Ca, Sr and Ba;

B represents Ti; and z represents an atomic ratio satisfying the following condition: $0<z\leqq0.5$.

4. A catalyst composition comprising a perovskite-type composite oxide represented by the following general formula (4):

$$AB_{1-z}Pt_zO_3 \qquad (4)$$

wherein A represents at least one element selected from the group consisting of Ca and Ba;

B represents Ti; and z represents an atomic ratio satisfying the following condition: $0<z\leqq0.5$.

* * * * *